United States Patent [19]

Matsumoto et al.

[11] Patent Number: 5,808,186
[45] Date of Patent: Sep. 15, 1998

[54] METHOD FOR DETECTING MISFIRE BY FLUCTUATION IN CRANKSHAFT ROTATION

[75] Inventors: Takuya Matsumoto; Toru Hashimoto; Mitsuhiro Miyake; Yasuhisa Yoshida; Mitsuhiko Yanagisawa; Hiroyuki Nakajima; Koichi Namiki; Satoshi Kasai, all of Tokyo, Japan

[73] Assignee: Mitsubishi Jidosha Kogyo Kabushiki Kaisha, Tokyo, Japan

[21] Appl. No.: 142,481

[22] PCT Filed: Jun. 8, 1993

[86] PCT No.: PCT/JP93/00765

§ 371 Date: Feb. 2, 1994

§ 102(e) Date: Feb. 2, 1994

[87] PCT Pub. No.: WO93/25810

PCT Pub. Date: Dec. 23, 1993

[30] Foreign Application Priority Data

Jun. 9, 1992 [JP] Japan .................................. 4-149431
Feb. 17, 1993 [JP] Japan .................................. 5-028215

[51] Int. Cl.$^6$ .................................................. G01M 15/00
[52] U.S. Cl. ............................................................ 73/117.3
[58] Field of Search ................................... 73/116, 117.3; 123/419, 436; 364/431.07, 431.08

[56] References Cited

U.S. PATENT DOCUMENTS

| | | |
|---|---|---|
| 4,366,541 | 12/1982 | Mouri et al. . |
| 4,471,653 | 9/1984 | Kawamura et al. ....................... 73/116 |
| 4,635,201 | 1/1987 | Izumi et al. ........................... 364/431.07 |
| 4,930,479 | 6/1990 | Osawa et al. ............................ 123/436 |
| 5,041,979 | 8/1991 | Hirka et al. ............................... 73/116 |
| 5,056,360 | 10/1991 | Dosdall et al. . |
| 5,086,741 | 2/1992 | Nakamura et al. ...................... 123/436 |
| 5,111,405 | 5/1992 | Maeda et al. .............................. 73/116 |
| 5,117,681 | 6/1992 | Dosdall et al. . |
| 5,191,788 | 3/1993 | Nishimura .............................. 73/117.3 |
| 5,197,325 | 3/1993 | Tamura et al. ........................ 73/117.3 |
| 5,200,899 | 4/1993 | Ribbens et al. ........................... 73/116 |
| 5,213,081 | 5/1993 | Fujimoto ................................. 123/436 |
| 5,245,866 | 9/1993 | Hashiguchi et al. ................... 73/117.3 |
| 5,263,364 | 11/1993 | Nakayama et al. ....................... 73/116 |
| 5,263,453 | 11/1993 | Wakahara et al. ..................... 73/117.3 |
| 5,301,546 | 4/1994 | Inada et al. ............................ 73/117.3 |
| 5,307,671 | 5/1994 | Akase .................................... 73/117.3 |
| 5,485,374 | 1/1996 | Takaku et al. ......................... 73/117.3 |

FOREIGN PATENT DOCUMENTS

| | | |
|---|---|---|
| 63-57616 | 11/1988 | Japan . |
| 2 49955 | 2/1990 | Japan . |
| 4 66755 | 3/1992 | Japan . |
| 4 203341 | 7/1992 | Japan . |
| 5 18311 | 1/1993 | Japan . |
| WO 9307497 | 4/1993 | WIPO . |

OTHER PUBLICATIONS

Patent Abstracts of Japan, vol. 16, No. 339 (M–1284) 22 Jul. 1992 regarding Japanese Patent No. JP–A–04 101 071.

*Primary Examiner*—Richard Chilcot
*Assistant Examiner*—Eric S. McCall

[57] ABSTRACT

A method for detecting a misfire by fluctuation in crankshaft rotation in which the occurrence of a misfire can be detected exactly by eliminating the effect of detection error in detecting the fluctuation in crankshaft rotation, caused by the error in the construction of a crank angle sensor. By succeedingly receiving pulses from the crank angle sensor, a processor detects a time interval taken from the entering into a crankshaft rotation angle region, relating to a cylinder corresponding to both pulses, to the leaving therefrom (S2), calculates the crankshaft angular acceleration $D\omega_n$ by using the correction factor calculated on the basis of the above detected time interval, and the time interval determined by dividing the time taken for one rotation of the crankshaft by the number of cylinders (S3, S4), the latter interval being free from sensor error, and detects the occurrence of a misfire when the calculated value $D\omega_n$ is less than the decision value (S5 through S7).

17 Claims, 15 Drawing Sheets

METHOD FOR DETECTING MISFIRE BY FLUCTUATION IN CRANKSHAFT ROTATION

TECHNICAL FIELD

The present invention relates to a method for detecting a misfire by the fluctuation in crankshaft rotation and more particularly, to a method for detecting a misfire in which the occurrence of the misfire can be detected exactly by eliminating the detection error in detecting the fluctuation in crankshaft rotation which detection error is caused by the error in the construction of a crank angle sensor.

BACKGROUND ART

If a misfire condition, in which combustion in a cylinder is not performed properly, occurs during the operation of an internal combustion engine due to the failure of fuel injector or the like, the exhaust gas characteristic or the like of the internal combustion engine is deteriorated. To combat this problem, the information corresponding to the number of revolutions or rotation speed is calculated on the basis of the period of each predetermined crank angle corresponding to each cylinder of an engine, and the misfire condition of engine is detected on the basis of the change amount or change rate of this information, as disclosed in Japanese Unexamined Patent Publication No. H2-49955, etc. According to Japanese Unexamined Patent Publication No. H2-49955, if a misfire is detected on the basis of the deviation of the rotational angular velocity of the internal combustion engine from the rotational angular velocity before one firing as the reference angular velocity, that is, the rotational fluctuation, which is calculated for each firing interval in synchronization with the combustion stroke in the internal combustion engine, it cannot be detected as so exactly when random misfire occurs or when a misfire occurs approximately once for several revolutions. In Japanese Unexamined Patent Publication No. H2-49955, therefore, the reference angular velocity is renewed as necessary.

As described above, the period of the predetermined crank angle is detected by using a crank angle sensor. The crank angle sensor typically includes a rotating member which has a plurality of vanes or protrusions disposed at equal angular intervals and is mounted to the crankshaft for rotation in unison therewith, and a detecting portion which is so disposed as to face the rotating member and detects the passage of the vane. The vane of the rotating member protrudes in the radial direction at the periphery of the rotating member. The number of vanes corresponds to the number of engine cylinders; for example, the crank angle sensor for a 6-cylinder engine has three vanes. With the crank angle sensor of such a construction, when the end of one of the adjacent vanes passes through the detecting portion as the engine rotates, the entering of crankshaft into the crankshaft rotational angle region corresponding to that vane is detected, and when the end of the other vane passes through the detecting portion, the leaving of crankshaft from that region is detected. Thus, the time interval from the time of entering the angle region to the time of leaving the region, that is, the period is detected. Further, the crankshaft rotational speed at the crankshaft rotational angle region is calculated on the basis of the detected period. Then, a determination as to whether the misfire occurs is made based on the magnitude of the change in rotational speed.

In such a method for detecting a misfire, the accuracy in detecting period, that is, the accuracy in detecting the misfire depends on the vane angle interval at the crank angle sensor, that is, the length in the vane circumferential direction. Nevertheless, an error in the construction of crank angle sensor, particularly an error in manufacturing and installing the vane, is inevitable, so that variations are produced in the vane angle intervals, thereby the accuracy in detecting a misfire being decreased. When the vane angle interval is larger than the design value, the crankshaft rotation at this angle region requires much time. Therefore, it is sometimes judged by mistake that the crankshaft rotational speed has decreased at that angle region, so that the occurrence of a misfire is detected by mistake. Such mistaken detection cannot be eliminated by, e.g., the technology of renewing the reference angular velocity which is disclosed in Japanese Unexamined Patent Publication No. H2-49955.

DISCLOSURE OF THE INVENTION

An object of the present invention is to provide a method for detecting a misfire by the fluctuation in crankshaft rotation, in which the occurrence/absence of the misfire can be detected exactly by eliminating the effect of detection error, caused by the error in the construction of crank angle sensor, in detecting the fluctuation in crankshaft rotation.

To achieve the above object, the present invention provides a method for detecting a misfire in which the time interval from the time point, detected by a crank angle sensor, of entering the crankshaft rotational angle region corresponding to the particular stroke phase of each cylinder of an internal combustion engine to the time point, detected by the crank angle sensor, of leaving that angle region is detected sequentially, and the occurrence of the misfire is detected on the basis of the time interval.

This method comprises the steps of calculating the correction factor for compensating the error in the construction of the crank angle sensor, correcting the rotation information of the internal combustion engine on the basis of the detected time interval by using a correction factor, and detecting the occurrence of a misfire on the basis of the corrected rotation information of the internal combustion engine.

Preferably, the rotation information of the internal combustion engine is an average angular acceleration of the crankshaft. More preferably, the correction factor is repeatedly calculated on the basis of the time interval detected sequentially during the operation of the internal combustion engine to renew the correction factor, and the average angular velocity of crankshaft is sequentially determined on the basis of the time interval. Thus, the average angular acceleration is calculated sequentially on the basis of the time interval, the average angular velocity, and the correction factor.

Preferably, when the internal combustion engine is operated in a particular operating condition where the load of the internal combustion engine changes suddenly, or when a predetermined time has not elapsed from the start of the internal combustion engine, the renewal of the correction factor is prohibited. More preferably, at least one of conditions where the internal combustion engine is decelerated, where gear shift is performed by a transmission connected to the internal combustion engine, and where the vehicle on which the internal combustion engine is mounted is running on a rough road, is judged to be the particular operating condition.

Preferably, a separate and individual correction factor is calculated for each of a plurality of operating regions classified by the predetermined operation parameter of the internal combustion engine, and the correction factor for the present operating region is renewed each time the present operating region is determined, whereas the renewal of the correction factor for the operating region other than the present operating region is prohibited. More preferably, the predetermined operation parameter is the rotation speed of the internal combustion engine or the volumetric efficiency of the internal combustion engine. The operating regions are classified by the rotation speed and volumetric efficiency of the internal combustion engine which are the predetermined operation parameters.

Preferably, when the calculated correction factor deviates from a predetermined allowable range, the maximum or minimum value corresponding to the allowable range is used as the correction factor in place of the calculated correction factor. More preferably, the upper and lower limit values of the allowable range correspond to the maximum allowable error in the construction of the crank angle sensor. Also, the calculated correction factor is stored in nonvolatile memory, and the correction factor read from the nonvolatile memory is used as the initial value of correction factor when the internal combustion engine is started.

Preferably, the method for detecting a misfire is carried out by using a crank angle sensor comprising a rotating body which rotates together with the crankshaft, a plurality of discriminating means which are installed at intervals in the circumferential direction on the rotating body to discriminate between the entering time and the leaving time, and a detecting portion which is disposed on the fixed member of the internal combustion engine and which is operable to generate a detection signal each time each discriminating means approaches the detecting portion. The discriminating means of the crank angle sensor includes the first and second discriminating means for each cylinder. The time interval is detected by counting the interval between the first detection signal generated by the approach of the first discriminating means to the detecting portion and the second detection signal generated by the approach of the second discriminating means to the detecting portion. Further, the correction factor is calculated on the basis of the time interval and the rotation period of crankshaft including at least one of time points of occurrences of the first and second detection signals used for the detection of time interval. More preferably, the method for detecting a misfire is applied to the multi-cylinder internal combustion engine in which a plurality of cylinders are subjected to explosion strokes sequentially at equal intervals during the rotation of crankshaft. In this case, the crank angle sensor is designed so that the second discriminating means for each cylinder functions as the first discriminating means for the next cylinder which is succeedingly subjected to explosion stroke.

Preferably, the momentary correction factor information determined sequentially on the basis of the detected time interval and the rotation period of crankshaft during the operation of internal combustion engine is smoothed, and the rotation information of the internal combustion engine is corrected by using this smoothed value. For example, the latest correction factor $KLm(n)$ is calculated by using equations $$KLm(n)=a \cdot KLm(n-1)+(1-a) \cdot KLm$$

and $$KLm=\{A \cdot Tm(n)\}/T(n)$$

where a ($0 \leq a \leq 1$) is a weighting factor, and $KLm(n-1)$ is the previously calculated correction factor. Further, A is the number of discriminating means installed on the rotating body, $Tm(n)$ is the latest detected time interval, and $T(n)$ is the latest rotation period of the crankshaft.

The method for detecting a misfire in accordance with the present invention, having the above-described features, offers the following advantages.

According to the present invention, the occurrence of the misfire is detected on the basis of the rotation information of the internal combustion engine corrected by the correction factor for compensating the error in the construction of the crank angle sensor. This correction factor reflects the error of the crank angle sensor, for example, the error in manufacturing and installing the vane. The error of crank angle sensor can be eliminated by correcting the rotation information of internal combustion engine by using this correction factor. As a result, the misfire detection error caused by the error in the construction of the crank angle sensor can be eliminated, so that the occurrence/absence of the misfire can be detected exactly.

In a specific embodiment of the present invention, the average angular acceleration of the crankshaft is determined as the rotation information of the internal combustion engine. The angular acceleration of the crankshaft varies by quickly responding to the change in torque output of the internal combustion engine. Calculating the average, the detection error produced in detecting individual angular acceleration can be offset with each other. Therefore, the misfire detection on the basis of the average angular acceleration of the crankshaft has high response characteristic and reliability.

In another embodiment of the present invention, in which a crank angle sensor is used which comprises a plurality of discriminating means including the first and second discriminating means and a detecting portion generating detection signal each time each discriminating means approaches the detecting portion, the time interval is detected by counting the interval of the first and second detection signals generating when the first and second discriminating means approaches the detecting portion. This detected time interval exactly represents the actual rotation state of the crankshaft, and reflects the error in the construction of the crank angle sensor.

In this embodiment, the correction factor is determined on the basis of the detected time interval and the rotation period of the crankshaft including the occurrence time of at least one of the first and second detection signals used for the detection. When the crankshaft rotates at a constant speed, the rotation period of the crankshaft corresponds to the time interval detected by the crank angle sensor having no error due to the construction. Therefore, for example, when the ratio of rotation period of the crankshaft to time interval is determined as a correction factor on the basis of the rotation period of the crankshaft, corresponding to the time interval from which the effect of sensor error is removed, and the time interval which is actually detected and reflects the sensor error, the correction factor exactly represents the degree of sensor error.

The rotation period of the crankshaft is determined, for example, by summing up the time intervals detected sequentially during one rotation of the crankshaft. In other words, the rotation period of the crankshaft and in turn the correction factor can be determined during the operation of the internal combustion engine on the basis of the output of the crank angle sensor only. This saves labor for storing sensor error data, determined actually before the crank angle sensor is installed on the internal combustion engine and in turn the vehicle, into, for example, a controller of the vehicle.

The crank angle sensor used with a multi-cylinder internal combustion engine to which a specific embodiment of the present invention is applied can be designed so that the second discriminating means for each cylinder functions as the first discriminating means for the next cylinder which is subjected to explosion stroke after the above cylinder. In this case, the time intervals relating to the cylinders can be detected sequentially by using a relatively small number of discriminating means. As a result, the crank angle sensor can be simplified in construction.

According to another embodiment of the present invention, the momentary correction factor information which is sequentially determined on the basis of the detected time interval and the rotation period during the operation of an internal combustion engine is smoothed. Thus, the error in determining individual correction factor information, for example the detection error of individual time interval, is offset. Therefore, the misfire detection based on the rotation information of the internal combustion engine corrected by this smoothed value has high detecting accuracy.

In a specific embodiment of the present invention, when the internal combustion engine is operated in a particular operating condition in which the load of the internal combustion engine changes suddenly, or when a predetermined time has not elapsed from the start of the internal combustion engine, the renewal of the correction factor is prohibited. This is because the crankshaft does not rotate at a constant speed in the particular operating condition of the internal combustion engine or Just after the start of the engine; therefore, the correction factor exactly representing the sensor error cannot be determined from, e.g., the time interval and the rotation period of the crankshaft detected by using a crank angle sensor. The prohibition against the renewal of correction factor in the particular operating condition of the internal combustion engine or Just after the start of the engine prevents the occurrence of error in calculating the correction factor, thereby mistaken decision in detecting a misfire being prevented.

A specific embodiment of the present invention, in which a separate and independent correction factor is calculated with respect to each of a plurality of operating regions classified by the predetermined operation parameter of the internal combustion engine, is applied to the case where misfire detection effected by using the correction factor common to the entire operating region of the internal combustion engine is inappropriate. In this embodiment, the correction factor is renewed for the present operating region each time the present operating region is decided, whereas the renewal of the correction factor for the operating region other than the present operating region is prohibited. This makes the correction factor more suitable to the operating region or the operating condition of the internal combustion engine. As a result, the error of the crank angle sensor can be eliminated more satisfactorily, thereby the misfire detecting accuracy being improved.

According to a specific embodiment of the present invention in which, for example, when the calculated correction factor deviates from a predetermined allowable range corresponding to the maximum allowable error in the construction of a crank angle sensor, the maximum or minimum value of the correction factor is used in place of the calculated correction factor, the adverse effect caused by the error in calculating the correction factor can be eliminated even when the correction factor cannot be calculated properly for any reason, for example, due to an error in detecting the time interval, thereby mistaken decision in detecting a misfire being prevented.

In a specific embodiment of the present invention in which the calculated correction factor is stored in nonvolatile memory, the correction factor read from the nonvolatile memory at the start of the internal combustion engine is used as the initial value. Therefore, the correction factor can be made proper more quickly. That is to say, in order to obtain the correction factor which can properly correct the error of a crank angle sensor, it is normally necessary to calculate the correction factor repeatedly to some extent. In this embodiment, the proper correction factor reflecting the result of repeated calculation is stored in memory at all times. Therefore, this is read from the memory at the start of the internal combustion engine and used as the initial value of the correction factor, by which a misfire detection can be performed properly from the time just after the start of the internal combustion engine.

BEST MODE FOR CARRYING OUT THE INVENTION

A method for detecting a misfire by the fluctuation in crankshaft rotation in accordance with the first embodiment of the present invention will be described with reference to FIGS. 1 through 3.

A device for carrying out the method for detecting a misfire in accordance with this embodiment is mounted on a multi-cylinder internal combustion engine, for example a 6-cylinder engine (not shown), in which a plurality of cylinders are sequentially subjected to explosion strokes at equal time intervals during the rotation of a crankshaft. The device includes a controller 10, a crank angle sensor 20, and a cylinder discrimination sensor 30 as the main elements as shown in FIG. 1.

Figure 2:
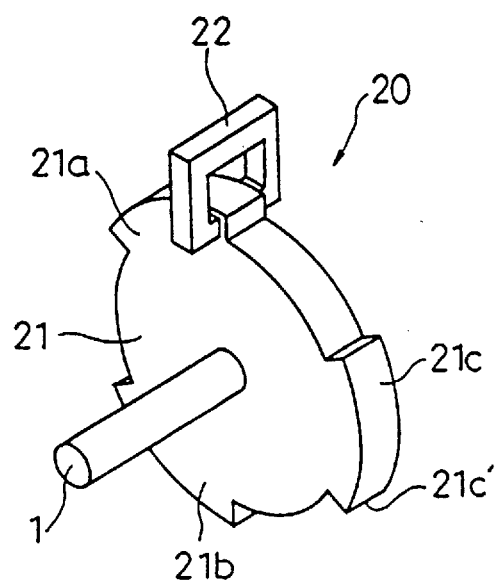
FIG. 2 is a perspective view of a crank angle sensor in the detecting device shown in FIG. 1.

Referring to FIG. 2, the crank angle sensor 20 comprises a rotating member 21 functioning as a rotating body which rotates integrally with a crankshaft 1 of the engine, and a detecting portion 22 which is so installed as to face the rotating member 21 and disposed on a fixed member (not shown) of the engine. At the periphery of the rotating member 21, first, second, and third vanes 21a, 21b, and 21c protruding in the crankshaft radial direction are formed as discriminating means, so that pulse output is generated as a detection signal when the passage of the vane 21a, 21b, or 21c is optically or electromagnetically detected by the detecting portion 22. The first to third vanes 21a, 21b, and 21c each have a circumferential length corresponding to a predetermined rotation angle of crankshaft, and are disposed spacedly in the circumferential direction at predetermined angular intervals. Therefore, the angular interval between the corresponding ends (the first and second discriminating means for each cylinder) of the adjacent vanes is 120 degrees. Actually, however, because of an error in the construction of crank angle sensor, particularly errors in manufacturing and installing the vanes 21a, 21b, and 21c, the angular interval between the ends of adjacent vanes is not always 120 degrees exactly. Usually, there is an error of angular interval of about 1 degree or less.

The cylinder discrimination sensor 30 is mounted to a camshaft (not shown) for rotation in unison therewith, so that pulse output is generated each time the camshaft passes a particular rotating position corresponding to one cylinder while the crankshaft 1 rotates twice and the camshaft rotates once.

The controller 10 functions as a main element of the misfire detecting device, and performs various normal engine control operations. It has a processor 11 for executing various control programs, read only memory 12 for storing the control programs, and random access memory 13 for temporarily storing data. The memory 13 has an nonvolatile memory region backed up by a battery (not shown). The processor 11 is connected, via an input circuit 14, to various sensors and switches (partially not shown) such as the crank angle sensor 20, the cylinder discrimination sensor 30, an ignition switch 40, a suction air amount sensor, a suction air temperature sensor, and a water temperature sensor. It is also connected, via an output circuit 15, to various driving circuits (the circuits corresponding to elements 50 and 60 only are shown by reference numerals 51 and 61) for driving various actuators, including a fuel injection valve 50, an alarm lamp 60 and the like. In FIG. 1, reference numeral 70 denotes a throttle position sensor which is used in another embodiment described later. The sensor 70 is connected to the processor 11 via the input circuit 14.

With the device of this embodiment which is mounted on a 6-cylinder engine in which firing operation is performed in the order of cylinder number, for example, when the end (front end 21c' or rear end constituting the first discriminating means) of the third vane 21c passes through the detecting portion 22, the crankshaft enters a first crankshaft rotation angle region corresponding to either one of the first and fourth cylinders (preferably the explosion stroke mainly in the one cylinder), which cylinders belong to a first cylinder group, and when the end (the second discriminating means) of the first vane 21a passes through the detecting portion 22, the crankshaft leaves the first rotation angle region. Likewise, when the end of the first vane 21a passes through the detecting portion 22, the crankshaft enters a second crankshaft rotation angle region corresponding to either one of the second and fifth cylinders, which belong to a second cylinder group, and when the end of the second vane 21b passes through the detecting portion 22, the crankshaft leaves the second rotation angle region. Further, when the end of the second vane 21b passes through the detecting portion 22, the crankshaft enters a third crankshaft rotation angle region corresponding to either one of the third and sixth cylinders, which belong to a third cylinder group, and when the end of the third vane 21c passes through the detecting portion 22, the crankshaft leaves the third rotation angle region. The discrimination between the first and fourth cylinders, the discrimination between the second and fifth cylinders, and the discrimination between the third and sixth cylinders are performed on the basis of the output of the cylinder discrimination sensor 30. When the detecting portion 22 generates a first detection signal when the first discriminating means (for example, the associated end of the third vane 21c) approaches the detecting portion, and generates a second detection signal when the second discriminating means approaches the detecting portion. In this embodiment applied to a 6-cylinder engine in which a plurality of cylinders are sequentially subjected to explosion strokes at equal time intervals during the rotation of crankshaft, the second discriminating means for each cylinder functions as the first discriminating means for the next cylinder which is subjected to explosion stroke after the above cylinder.

The operation of a misfire detecting device of the above construction will be described below.

Figure 3:
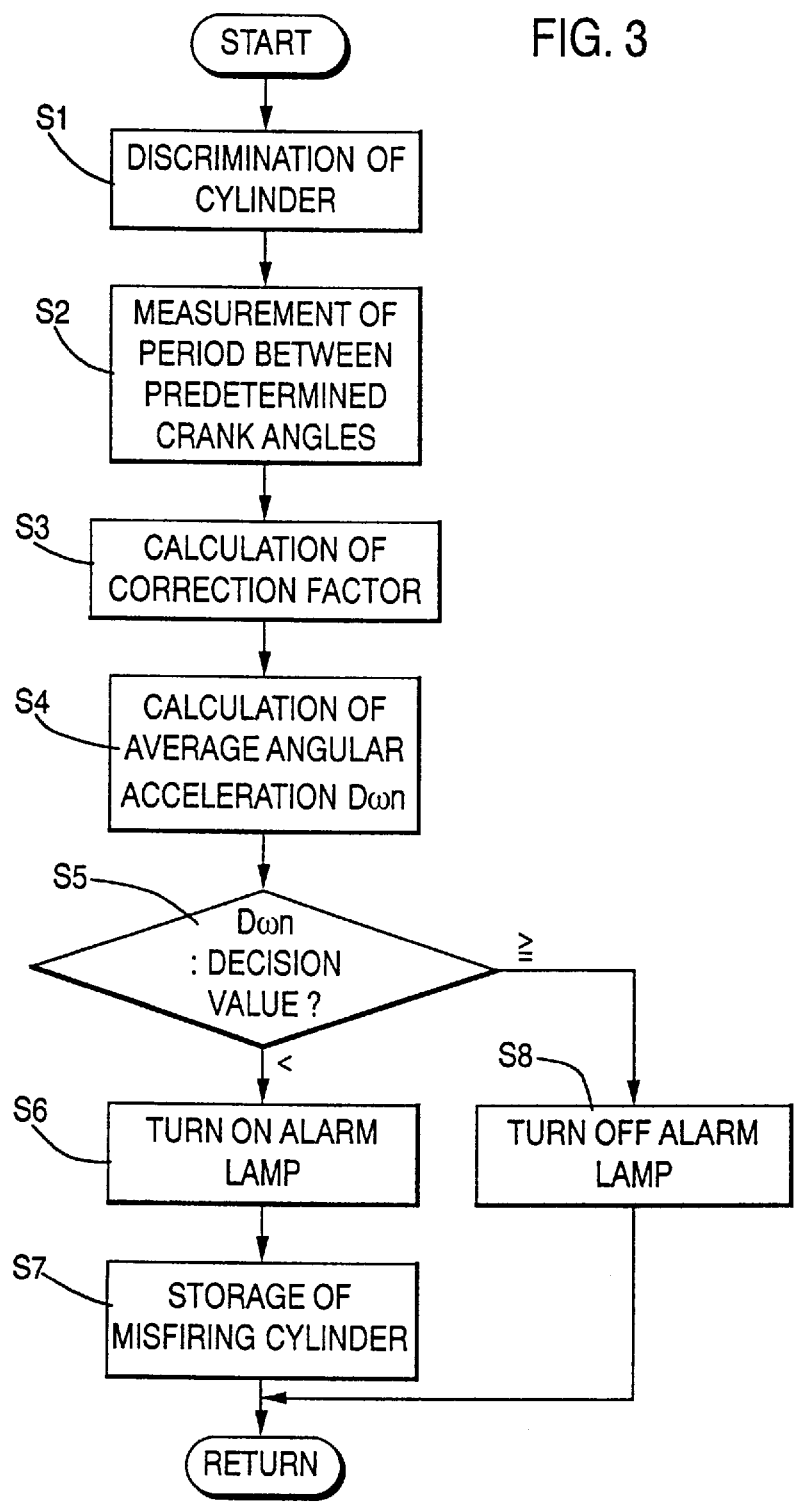
FIG. 3 is a flowchart showing a misfire detecting operation in accordance with a first embodiment of the present invention carried out by the controller shown in FIG. 1.

During the engine operation, the processor 11 periodically repeats the misfire detecting operation shown in FIG. 3 while sequentially receiving the pulse output from the crank angle sensor 20 and the pulse output from the cylinder discrimination sensor 30.

The processor 11 starts the misfire detecting operation each time it receives the pulse output from the crank angle sensor 20.

At each detection cycle, the processor 11 first determines the order or sequential number of the pulse output from the crank angle sensor among the pulse outputs of crank angle sensor sequentially received after receiving the pulse output from the cylinder discrimination sensor 30. Thus, the sequential number of the cylinder corresponding to the received pulse output of crank angle sensor is determined (Step S1). Preferably, the cylinder which is executing an explosion stroke (output stroke) at the present time is determined as the determined cylinder.

When the processor 11 decides the entering into the crankshaft rotation angle region corresponding to the determined cylinder group m (m is 1, 2, or 3) according to the receipt of the pulse output (a first detection signal) of crank angle sensor 20, it restarts a period measuring timer (not shown). The determined cylinder group m includes the cylinder determined in Step S1.

When receiving the next pulse output (a second detection signal) from the crank angle sensor 20, the processor 11 decides the leaving from the crankshaft rotation angle region corresponding to the determined cylinder group m, stops the time counting operation of the period measuring timer, and reads the result of time counting (Step S2). This result of time counting represents the time interval Tm(n) from the time of entering into the crankshaft rotation angle region corresponding to the determined cylinder group m to the time of leaving from that region, that is, the period Tm(n) which is defined by two predetermined crank angles corresponding to the determined cylinder group. Here, the subscript n in the period Tm(n) indicates that the concerned period corresponds to the n th firing operation in the determined cylinder. The period Tm(n) is the period between 120-degree crank angles in the determined cylinder group in a 6-cylinder engine. More commonly, it is the period between (720/N) degree crank angles in an N-cylinder engine.

The above pulse output representing the leaving from the crankshaft rotation angle region corresponding to the determined cylinder in the present cycle also represents the entering into the crankshaft rotation angle region corresponding to the next determined cylinder. Therefore, the cylinder determining step S1 for the next determined cylinder is executed according to this pulse output, and the period measuring timer is restarted to start the period measurement for the next determined cylinder.

Relating to the determined cylinder in the present cycle, the processor 11 calculates a correction factor KLm(n) relating to the determined cylinder group m using the equation KLm(n)=a·KLm(n−1)+(1−a)·KLm to eliminate the period measurement error due to the variations in the vane angle intervals in manufacturing vanes (Step S3). That is to say, the renewal (learning) of the correction factor is performed. Here, the symbol a is a filter constant stored in the memory 12 in advance, and takes a value not less than 0 and not more than 1. The symbol KLm(n−1) denotes the correction factor relating to the determined cylinder group m which is calculated in the previous detection cycle and stored in the memory 13. The symbol KLm denotes a value calculated from the equation KLm=Tm(n)÷(T(n)/3). Here, the symbol Tm(n) denotes the period between 120-degree crank angles detected this time for the determined cylinder group. The symbol T(n) denotes the sum of the periods between 120-degree crank angles of the first to third cylinder groups successively measured in the previous two cycles and in the present detection cycle, that is, the period between 360-degree crank angles (T(n)=T1(n)+T2(n)+T3(n)). If the engine speed is constant, the value of the period between 360-degree crank angles divided by the value 3. T(n)/3, is equal to the exact period between 120-degree crank angles in the case where there is no error of the vane angle interval. Therefore, the calculated value KLm indicates the ratio of the period between 120-degree crank angles for the determined cylinder group m to the exact period between 120-degree crank angles.

In other words, the correction factor KLm(n) is determined as momentary correction factor information on the basis of the detection time interval Tm(n) and the rotation period T(n) of crankshaft including the time when either or both of the first and second detection signals used in detecting the detection time interval. Further, the momentary correction factor information sequentially determined in this manner on the basis of the detection time interval and the crankshaft rotation period is smoothed.

Further, from the period between 120-degree crank angles $T_n$ (=Tm(n)) measured in Step S2 of the present detection cycle, the processor 11 calculates the average angular velocity $\omega_n$ (=120 degree/$T_n$) of the crankshaft at this period. Then, the processor reads the average angular velocity $\omega_{n-1}$ which is measured in the previous detection cycle and stored in the memory 13. Next, the processor 11 calculates the average angular acceleration $D_n$ of crankshaft at the period between 120-degree crank angles of the present detection cycle from the equation $D_n = KLm(n) \cdot (\omega_n - \omega_{n-1}) \div \{(1/2) \cdot (T_n + T_{n-1})\}$ using the measured values $T_n$, $T_{n-1}$, the calculated values $\omega_n$, $\omega_{n-1}$, and the correction factor KLm(n) calculated in Step S3 (Step S4). Here, the symbol D is a differential operator symbol denoting d/dt. Thus, the angular acceleration of crankshaft is determined on the basis of the measurement period corrected by using the correction factor KLm(n).

Then, the processor 11 compares the average angular acceleration $D\omega_n$ representing the fluctuation in crankshaft rotation and calculated in Step S4 with a decision value for deciding misfire which is stored in the memory 12 in advance, to determine a magnitude relation therebetween, to thereby detect the occurrence/absence of a misfire in the determined cylinder (Step S5). The decision value is set to a negative value. If it is decided that the calculated value $D\omega_n$ is lower than the decision value, the processor 11 sends a drive signal of, for example, H level to a lamp driving circuit 61 to turn on an alarm lamp 60, by which a warning is given to tell that a misfire has occurred in the determined cylinder (Step S6). Further, the occurrence of a misfire in the cylinder determined in Step S1 is stored in the memory 13 (Step S7). If it is decided in Step S5 that the average angular acceleration $D\omega_n$ of crankshaft is equal to or higher than the decision value, the processor 11 sends a drive signal of, for example, L level to turn off the alarm lamp 60, by which a warning is given to tell that a misfire has not occurred in the determined cylinder (Step S8). The above-described misfire detection based on the corrected period is exact without subjecting to the effect of vane angle interval error.

After the misfiring cylinder is stored in Step S7 or the alarm lamp turns off in Step S8, the processor 11 waits until the next pulse output from the crank angle sensor 20 is received. Upon the receipt of pulse output, the processor 11 restarts the detecting operation shown in FIG. 3.

A method for detecting a misfire in accordance with a second embodiment of the present invention will be described below with reference to FIGS. 4 through 6.

This embodiment is characterized mainly in that the calculation and renewal (learning) of the correction factor are prohibited when the engine is operated in an operating condition other than the condition in which the correction factor can be calculated properly. Further, the embodiment is characterized in that a suitable value is used in place of the calculated value when the calculated correction factor deviates from its allowable range, and the stored value of correction factor is used as the initial value of correction factor at the start of engine. The method of this embodiment can be carried out by using the device shown in FIGS. 1 and 2 in accordance with the first embodiment described above; therefore, the explanation of the device is omitted.

Figure 4:
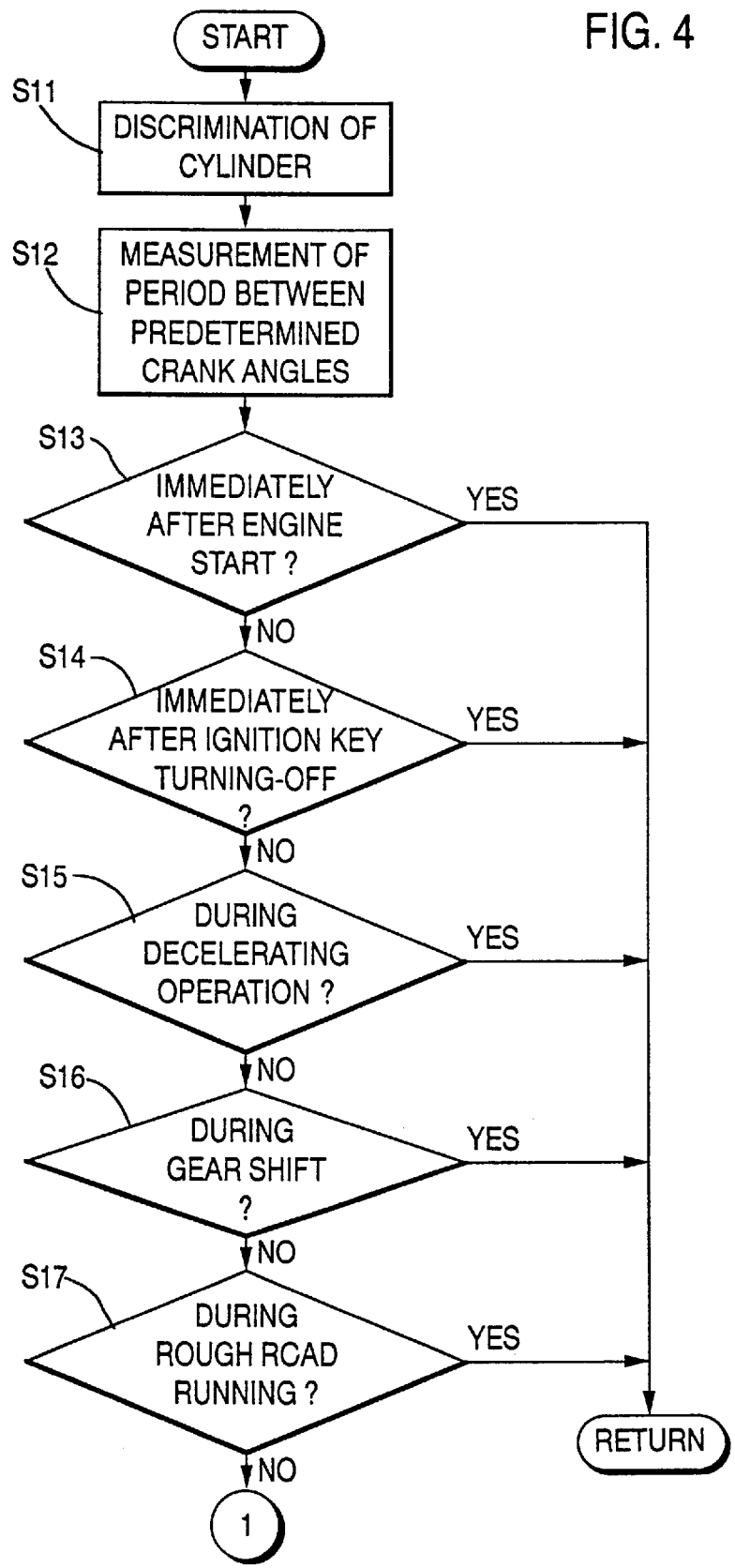
FIG. 4 is a flowchart showing part of misfire detecting operation in the method for detecting misfire in accordance with a second embodiment of the present invention.
Figure 5:
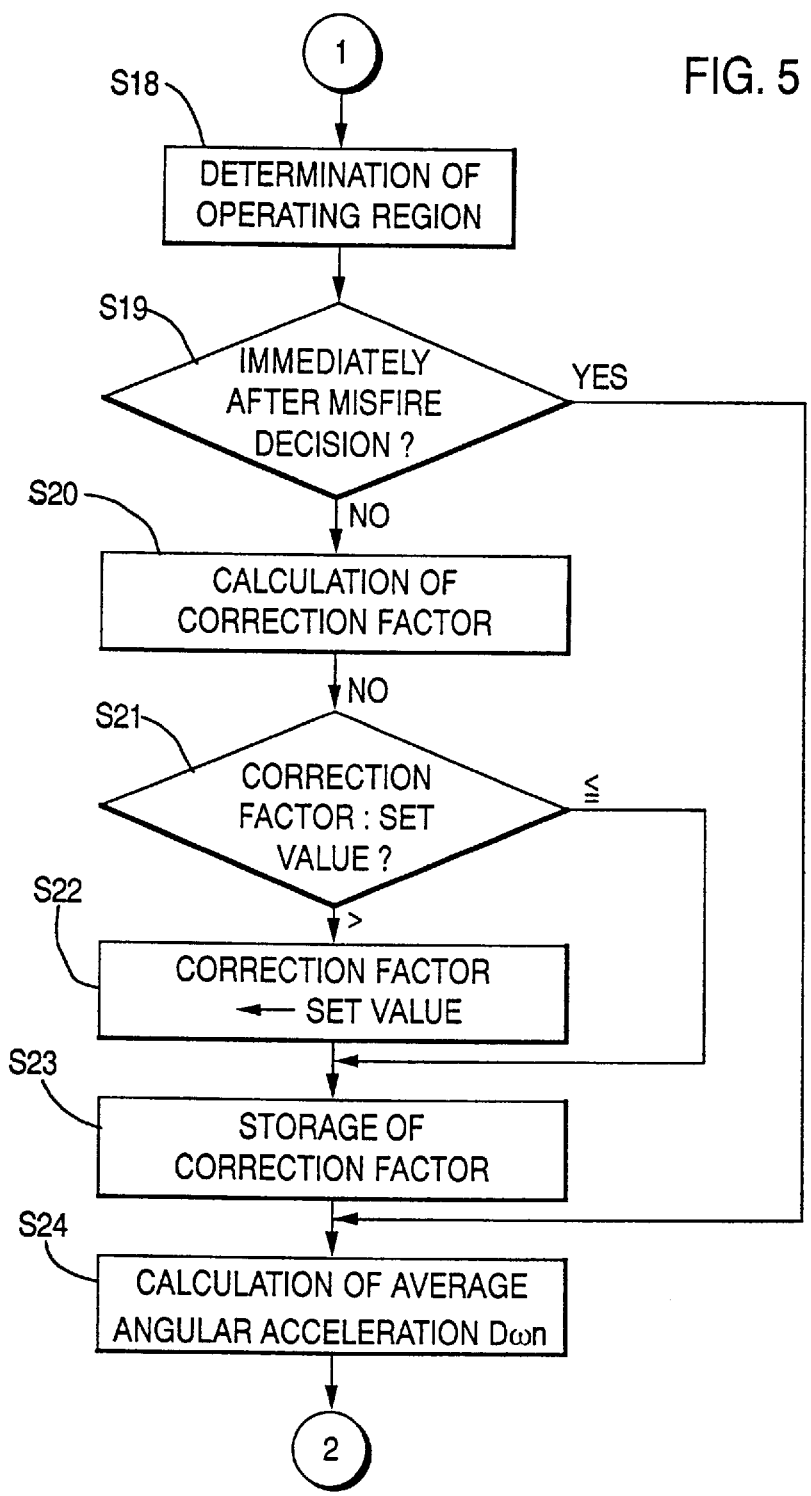
FIG. 5 is a flowchart showing another part of misfire detecting operation which is partly shown in FIG. 4.
Figure 6:
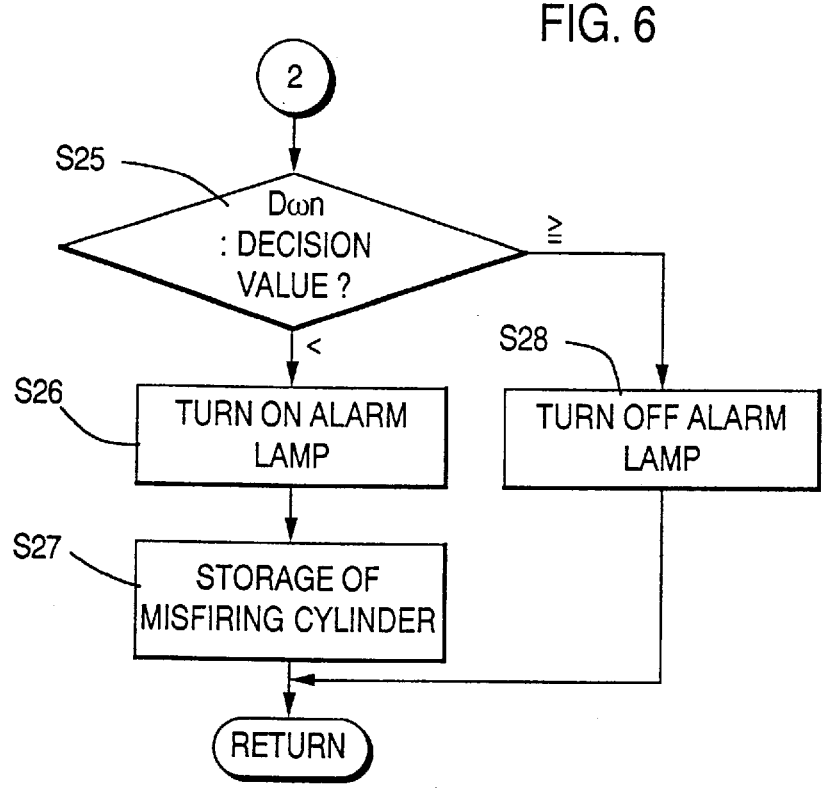
FIG. 6 is a flowchart showing the remainder of misfire detecting operation which is partly shown in FIGS. 4 and 5.

During the engine operation, the processor 11 periodically repeats the misfire detecting operation shown in FIGS. 4 through 6 while sequentially receiving the pulse output from the crank angle sensor 20 and the pulse output from the cylinder discrimination sensor 30. Specifically, the processor 11 starts the misfire detecting operation cycle each time it receives the pulse output representing the entering into the crankshaft rotation angle region corresponding to the present detection cycle. In each detection cycle, the processor 11 sequentially executes the determination of cylinder and the measurement of period between predetermined crank angles in Steps S11 and S12 corresponding to Steps S1 and S2 in FIG. 3, respectively. Next, the processor 11 decides whether the engine is being started or in the state immediately after the start or not (Step S13). If it is decided that the engine is being started or in the state immediately after the start, the processor 11 prohibits the calculation and renewal of the correction factor and in turn the detection of a misfire in the present detection cycle.

The reason for this will be explained. In the later-described correction factor calculation step S20 (FIG. 5) corresponding to Step S3 in FIG. 3 in accordance with the first embodiment described above, the value obtained by dividing the sum of the periods between 120-degree crank angles of the first to third cylinder group, that is, the period between 360-degree crank angles, by 3 is used as the exact period between 120-degree crank angles. However, in order to use the value of the sum of three periods between 120-degree crank angles divided by 3 as the exact period between 120-degree crank angles, the engine speed needs to be substantially constant. When the engine speed changes suddenly as when the engine is being started or in the state immediately after the start, this need is not met. In such a case, the calculation and renewal of correction factor and the detection of a misfire are prohibited in this embodiment.

If it is not decided in Step S13 that the engine is being started or in the state immediately after the start, the processor 11 decides whether or not the ignition key 40 is turned off or immediately after turning off (Step S14). Immediately after the ignition key is turned off, the coasting operation of engine is performed for a while, and the controller 10 and various sensors are not deenergized. During the coasting operation of engine, the engine speed decreases rapidly, so that the correction factor cannot be determined exactly. Therefore, proper detection of a misfire cannot be performed. For this reason, in this embodiment, the calculation and renewal of correction factor and the detection of a misfire are prohibited when the ignition key is turned off or immediately after turning off.

Figure 7:
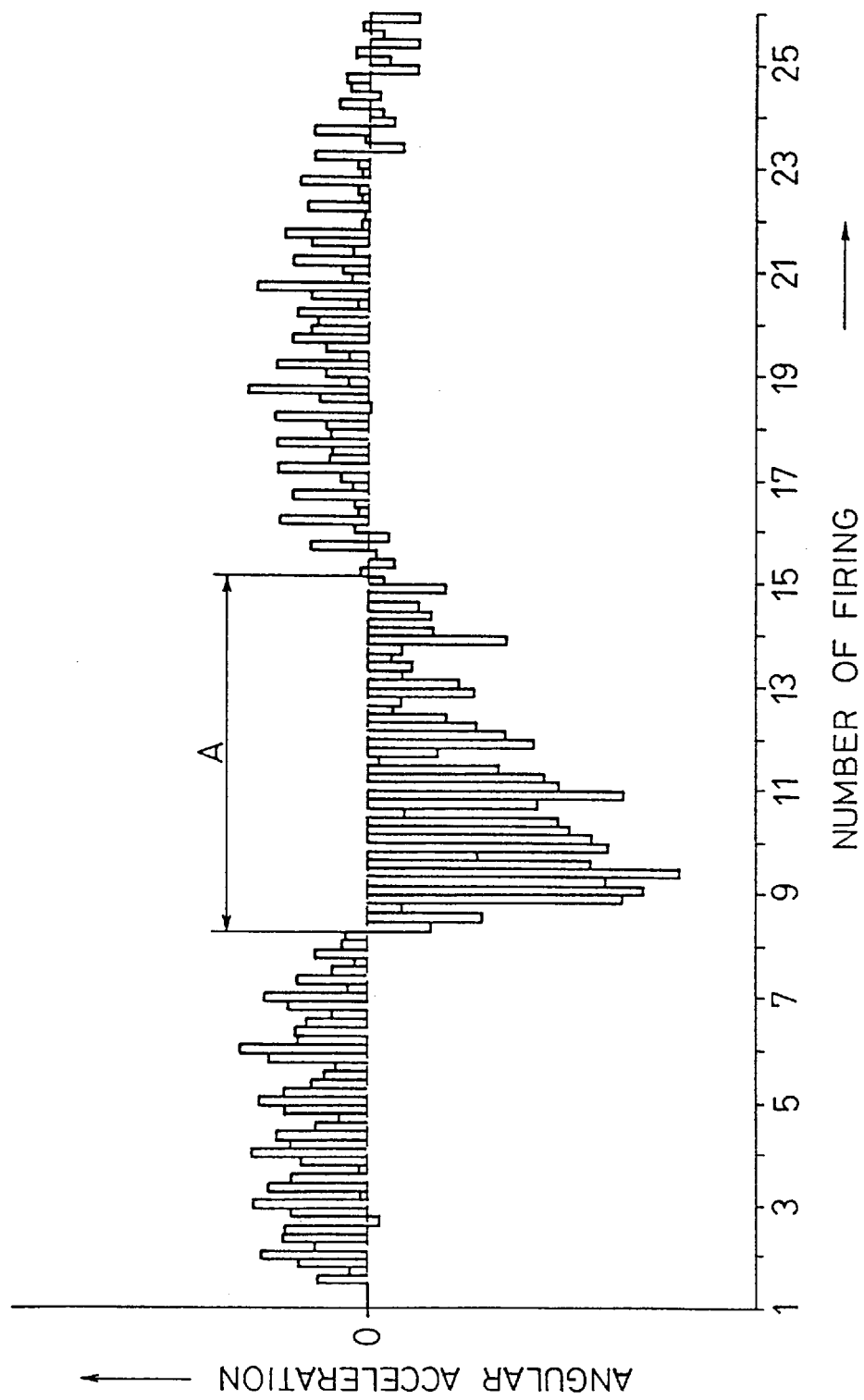
FIG. 7 is a graph showing an example of change in angular acceleration in the decelerating operating condition.

Further, the processor 11 decides whether the engine is in decelerating operation or not (Step S15). If it is decided that the engine is in decelerating operation, the detecting operation in the present cycle is immediately terminated. The calculation and renewal of correction factor and the detection of a misfire are prohibited in the decelerating operating condition in which errors in calculating the correction factor and in detecting a misfire are prone to occur because the angular acceleration (corresponding to the average angular acceleration D$\omega$ in this embodiment) increases greatly to the negative side as shown as section A in FIG. 7. If it is decided that the engine is not in decelerating operation, the processor 11 decides whether gear shift is being performed by a transmission (not shown) connected to the engine or not (Step S16).

Figure 8:
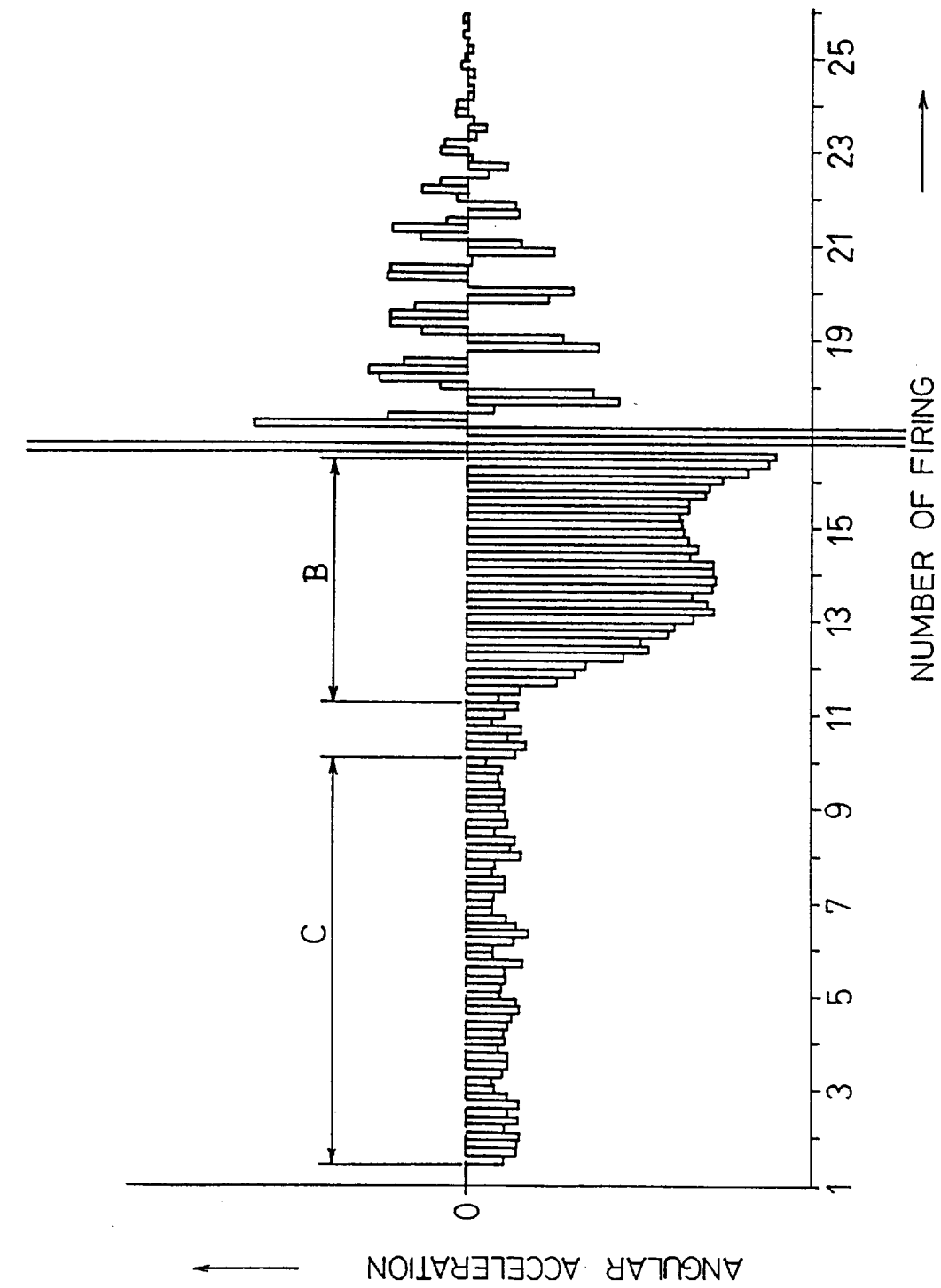
FIG. 8 is a graph showing an example of change in angular acceleration in the gear shift operation.

If it is decided that gear shift is being performed, the processor 11 terminates the detecting operation in the present cycle. The calculation and renewal of correction factor and the detection of a misfire are prohibited during clutch engagement by manual transmission (more commonly, during a gear shift by a transmission) in which errors in calculating the correction factor and in detecting a misfire are prone to occur because the angular acceleration increases greatly to the negative side as shown as section B in FIG. 8. In FIG. 8, section C represents a decelerating operating condition before clutch engagement. If it is decided that gear shift is not being performed, the processor 11 decides whether the vehicle on which the engine is mounted is running on a rough road or not (Step S17).

Figure 9:
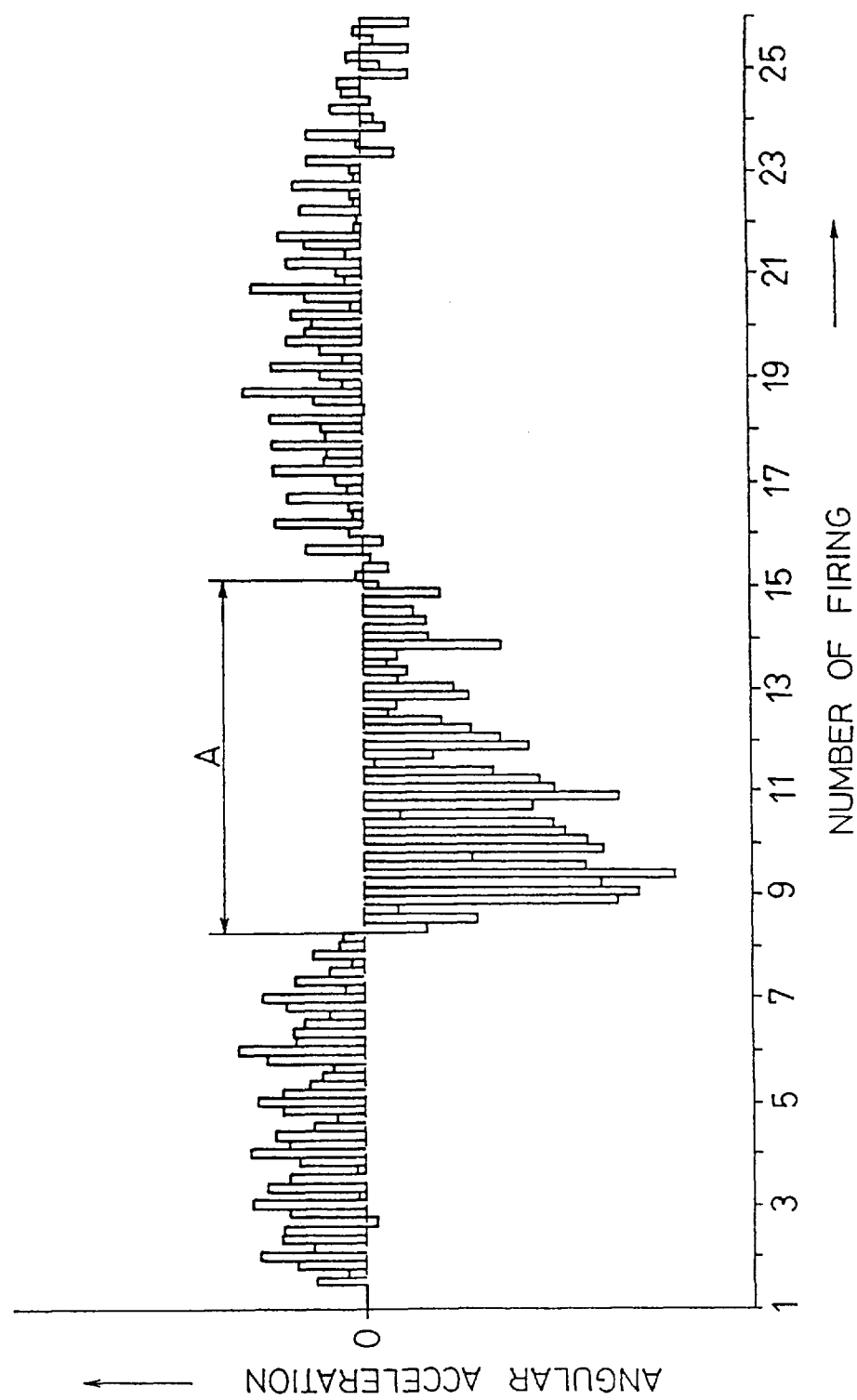
FIG. 9 is a graph showing an example of change in angular acceleration in rough road running.

If it is decided that the vehicle is running on a rough road, the processor 11 terminates the detecting operation in the present cycle, and prohibits the calculation and renewal of correction factor and the detection of a misfire during the running on a rough road, during which errors in calculating the correction factor and in detecting a misfire are prone to occur because the angular acceleration greatly fluctuates to both positive and negative sides as shown in FIG. 9. In FIG. 9, at the time points to which triangular marks are attached, the angular acceleration decreases greatly due to misfire occurring actually.

Figure 10:
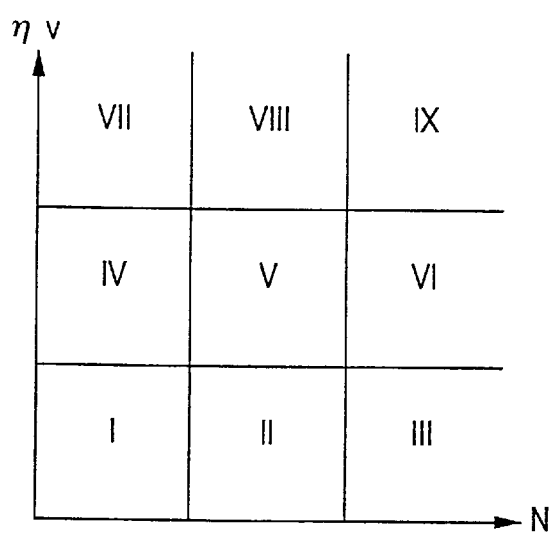
FIG. 10 is a chart showing a typical setting of engine operating regions relating to the method of the second embodiment.

If it is decided that the vehicle is not running on a rough road, that is, if the decision results in Steps S13 through S17 are No, The processor 11 calculates the volumetric efficiency $\eta v$, which indicates the engine load condition, and the engine speed N as predetermined operation parameters, and decides which of nine operating regions I through IX classified by $\eta v$ and N as shown by way of example in FIG. 10 the present engine operating region corresponds to (Step S18). Next, the processor 11 decides whether or not the occurrence of a misfire is being decided or has Just been decided (Step S19).

If it is not decided in Step S19 that a misfire is being decided or has Just been decided, the processor 11 calculates the correction factor KLmi(n) relating to the determined cylinder group m and the present engine operating region i (=I, II, . . . or IX) by using the equation KLmi(n)=a·KLmi(n−1)+(1−a)·KLmi in Step S20 corresponding to Step S3 in FIG. 3. In this embodiment, as indicated by the subscript i, the separate and independent correction factor KLmi is used for each of nine engine operating regions.

Then, the processor 11 compares the correction factor KLmi(n) calculated in Step S20 with a set value which corresponds to the maximum allowable error in the construction of the crank angle sensor and which is stored in advance in the read only memory 12 or the nonvolatile memory region of the random access memory 13 (Step S21). The set value is set as the allowable maximum value of correction factor in advance in view of the maximum allowable values in the design and manufacture of device such as errors in manufacturing the vane, errors in installing the vane, errors in installing the crank angle sensor, and errors of crank angle sensor output. Regarding the vane angle interval, the correction factor for compensating the vane angle interval error is the maximum when the vane angle interval error is equal to the maximum allowable value. The maximum allowable vane angle interval error is determined when the maximum allowable vane manufacturing error and the maximum allowable vane installing error are determined. Consequently, if the maximum allowable vane manufacturing error and the maximum allowable vane installing error are determined, the maximum value of correction factor or the above set value can be determined.

If it is decided that the correction factor KLmi(n) calculated in Step S20 is larger than the set value set from the viewpoint described above, the processor 11 sets the set value as the correction factor KLmi(n) in place of the calculated correction factor (Step S22). Specifically, when the calculated value of the correction factor KLmi(n) exceeds the set value which is equal to the upper limit value of correction factor, the processor 11, judging that the correction factor could not be calculated correctly because of an error occurring, e.g., in period measurement in Step S12, forcedly prohibits the use of calculated correction factor.

Following Step S22, or if it is decided in Step S21 that the calculated correction factor KLmi(n) is equal to or less than the set value and hence the correction factor is calculated correctly, the processor 11 stores the correction factor KLmi (n), calculated in Step S20 or set in Step S22, in the nonvolatile memory region of random access memory 13 (Step S23). Thus, only the correction factor KLmi(n) for the present engine operating region is renewed. That is to say, the renewal of correction factor for operating regions other than the present engine operating region is prohibited. Next, the processor 11 calculates the average angular acceleration $D\omega_n$ of the crankshaft at the period between 120-degree crank angles in the present detecting cycle from the equation $D\omega_n = KLmi(n) \cdot (\omega_n - \omega_{n-1}) \div \{(\frac{1}{2}) \cdot (T_n + T_{n-1})\}$ (Step S24).

If it is decided in Step S19 that a misfire is being decided or has just been decided, the processor 11, judging that the engine rotation fluctuates due to the occurrence of a misfire, immediately executes the average angular acceleration calculating step S24 without executing the correction factor calculating step S20 and other steps. In this case, the processor 11 calculates the average angular acceleration $D\omega_n$ by using the latest correction factor KLmi which is calculated in the previous cycle and stored in the nonvolatile memory region of memory 13. Incidentally, the correction factor KLmi used in calculating the angular acceleration relates to the determined cylinder group m and the present engine operating region i.

Next, the processor 11 compares, in Step 25 corresponding to Step S5 in FIG. 3, the average angular acceleration $D\omega_n$ with a decision value for detecting a misfire which is stored in the memory 12 in advance. Further, according to the decision result, the processor 11 executes the alarm lamp turning-on step 26 and the misfiring cylinder storing step 27 corresponding to Steps S6 and S7, respectively, or the alarm lamp turning-off step 28 corresponding to Step S8. Then, the processor 11 terminates the detecting operation in the present cycle.

During engine operation, the correction factor is calculated and renewed repeatedly, and the latest calculated correction factor is stored in the nonvolatile memory region of the memory 13. After that, if the engine once stopped is restarted, the processor 11 uses the correction factor read from the memory 13 as the initial value of correction factor in calculating the correction factor when the engine is restarted (however, when the cycle immediately after the decision result in Step S13 becomes No is executed). Thus, a proper correction factor can be obtained even in the initial stage after engine start.

A method for detecting misfire in accordance with a third embodiment of the present invention will be described below with reference to FIGS. 11 and 12.

This embodiment is characterized mainly by the method of rough road decision, and differs from the above second embodiment in that the common correction factor is used for all engine operating regions, that the magnitude of calculated correction factor is not regulated, and that the calculated correction factor is not stored. The method of this embodiment can be carried out by using the device shown in FIGS. 1 and 2; therefore, the explanation of the device is omitted.

In each cycle of misfire detecting operation executed repeatedly (FIGS. 11 and 12), the processor 11 sequentially executes the cylinder determining step S101 and the period measuring step S102 corresponding to Steps S11 and S12 in FIG. 4. Next, the processor 11 compares the elapsed time TIM1 determined by referring to a first timer (not shown) for counting the elapsed time TIM1 from the engine start with a first set value, to decide whether the engine is being started or in the state immediately after engine start or not (Step S103). This set value is set to a value (10 seconds to 30 seconds) slightly higher than the time which is usually necessary to reach the constant rotating condition of engine from the engine start. Incidentally, the first timer is restarted under the control of processor 11 when the ignition key 40 is switched from the off position to the on position to start the engine (at the engine start). To simplify the illustration, the illustration of control procedure relating to this is omitted.

If it is decided in Step 103 that the elapsed time TIM1 is equal to or more than the set value and the engine is not in the state immediately after engine start, the processor 11 compares the elapsed time TIM2 determined by referring to a second timer (not shown) for counting the elapsed time TIM2 from the ignition key turning off time with a second set value, to decide whether or not the ignition key 40 is turned off or immediately after turning off (Step S104). Although the illustration is omitted, the second timer for counting the elapsed time TIM2 is restarted when the ignition key 40 is switched from the on position to the off position. The second set value is set to a value slightly higher than time which is usually necessary, from the ignition turning off time, to reach the condition where the engine rotation is stopped and the controller 10 is deenergized so that the calculation and renewal of correction factor and the detection of misfire are not performed by the controller.

If it is decided in Step S103 that the elapsed time TIM1 from the engine start is less than the first set value and the engine is in the state immediately after engine start, or if it is decided in Step S104 that the elapsed time TIM2 from the ignition key turning off time is less than the second set value and the condition is immediately after turning off of ignition key, the detecting operation in the present cycle is immediately terminated. Thus, the calculation and renewal of correction factor and the detection of a misfire at the engine start are prohibited.

After it is decided in Step S103 that the engine is not in the state immediately after engine start, if it is decided in Step S104 that the elapsed time TIM2 is equal to or more than the second set time and the condition is not immediately after turning off of ignition key, the processor 11 first detects the engine load condition on the basis of the detection output of an air flow sensor, a suction air negative pressure sensor, a throttle sensor and the like. In this embodiment, the volumetric efficiency ηv of engine representing the engine load condition is calculated. When the air flow sensor is used for detecting the engine load condition, the processor 11 determines the suction air amount per one suction stroke A/N, and determines dimensionless value corresponding to the volumetric efficiency by dividing this A/N by full open A/N in the same rotating condition. Next, the processor 11 compares the volumetric efficiency thus calculated with a third set value (for example 18%) corresponding to the volumetric efficiency representing the decelerating operating condition of the engine, to decide whether the engine is in the decelerating operating condition or not (Step S105). If it is decided in Step S105 that the calculated value of volumetric efficiency ηv is equal to or more than the third set value and the engine is not in the decelerating operating condition, the processor 11 compares the elapsed time TIM3 from the time of entering into the decelerating condition determined by referring to a third timer (not shown) with a fourth set value corresponding to the time which is usually necessary to reach the finish of gear shift from the entering into the decelerating operating condition (Step S106). If it is decided in Step S106 that the elapsed time TIM3 is equal to or more than the fourth set value and gear shift is not being performed, the processor 11 compares the elapsed time TIM4 from the time point of rough road running decision determined by referring to a fourth timer (not shown) with a fifth set value representing the prohibition time of the calculation and renewal of correction factor and the detection of a misfire in relation to rough road running (Step S107).

If it is decided in Step S107 that the elapsed time TIM4 is equal to or more than the fifth set value and the prohibition time has already elapsed, the processor 11 sequentially executes Steps S108 through S110 corresponding to Steps S19, S20, and S24 in FIG. 5, respectively. Describing briefly, the processor 11 determines the elapsed time TIM5 from the misfire detection time by referring to a fifth timer (not shown) which is restarted when the occurrence of a misfire is decided as described later, and compares the elapsed time TIM5 with a sixth set value representing the prohibition time of the calculation and renewal of correction factor in relation to the occurrence of a misfire (Step S108). If it is decided in Step S108 that the elapsed time TIM5 is equal to or more than the sixth set value and the prohibition time of the calculation and renewal of correction factor has already elapsed, the processor 11 calculates the correction factor KLm(n) relating to the cylinder group m determined in the present cycle to renew the correction factor, and then calculates the average angular acceleration $D\omega_n$ of the crankshaft at the period between 120-degree crank angles in the present detection cycle (Steps S109 and S110). If it is decided in Step S108 that the elapsed time TIM5 is less than the sixth set value and the prohibition time of the calculation and renewal of correction factor has not yet elapsed, the processor 11 immediately executes Step S110 without executing Step S109.

If it is decided in Step S105 that the calculated value of volumetric efficiency $\eta v$ is less than the set value and the engine is run in the decelerating operating condition, the processor 11 restarts the third timer for counting the elapsed time from the entering into the decelerating operating condition (Step S111), resets the flag $F_{RR}$ to a value "0" representing that the rough road Judgment decision is not being executed (Step S112), and then immediately terminates the detecting operation in the present cycle. That is to say, the calculation and renewal of correction factor and the detection of a misfire are prohibited in the decelerating operating condition.

If it is decided in Step S106 that the elapsed time TIM3 from the time of entering into the decelerating operating condition is less than the fourth set value and the gear shift is being performed, the processor 11 terminates the detecting operation in the present cycle, by which the calculation and renewal of correction factor and the detection of a misfire are prohibited when the gear shift is performed. If it is decided in Step S107 that the elapsed time TIM4 from the moment when rough road running is detected is less than the fifth set value and the prohibition time of the calculation and renewal of correction factor and the detection of a misfire has not yet elapsed in relation to rough road running, the processor 11 immediately terminates the detecting operation in the present cycle, and prohibits the calculation and renewal of correction factor and the detection of misfire.

When the occurrence/absence of a misfire is to be detected following the calculation and renewal of correction factor, the processor 11, after calculating the average angular acceleration $D\omega_n$ in Step S110, decides whether or not the flag $F_{RR}$ has the value "1" representing that the rough road running judgment is being performed (Step S113). If it is decided in Step S113 that the value of $F_{RR}$ is not equal to 1, that is, the rough road running judgment is not being performed, the processor 11 compares the calculated angular acceleration $D\omega_n$ with the misfire detection level (detection criterion) $TH_{MR}$ (<0) (Step S114). If the angular acceleration $D\omega_n$ is equal to or more than the misfire detection level $TH_{MF}$, the alarm lamp 60 is turned off in Step S115 corresponding to Step S28 in FIG. 6. If it is decided in Step S114 that the angular acceleration $D\omega_n$ is less than the misfire detection level $TH_{MF}$ and there is a high possibility of occurrence of misfire, the processor 11 temporarily stores the occurrence of a misfire for the misfire detection cylinder determined in Step S101 (Step S116).

Next, in order to decide whether the misfire condition decided in Step S114 is due to the effect of rough road running of vehicle or not, the rough road running judgment is started. Therefore, the processor 11 restarts a sixth timer for counting the elapsed time TIM6 from the start of the rough road running judgment (Step S117), sets the flag $F_{RR}$ to the value "1" representing that the rough road running judgment is being performed (Step S118), and then terminates the detecting operation in the present cycle.

In the misfire detection cycle immediately after the start of the above-described rough road running judgment, the processor 11 decides that the value of flag $F_{RR}$ is "1" in Step S113 following the above series of Steps S101 through S110. In this case, the processor 11 compares the elapsed time TIM6 from the start of rough road running judgment with a seventh set time representing the required time from the start to the end of rough road running judgment (Step S119). If it is decided in Step S119 that the elapsed time TIM6 is less than the seventh set value and the rough road running judgment time has not yet elapsed, the processor 11 compares the average angular acceleration $D\omega_n$ calculated in Step S110 with the rough road decision level $TH_{RR}$ (>0) (Step S120). The processor 11 judges that the vehicle is running on a rough road if the calculated angular acceleration $D\omega_n$ is higher than the rough road decision level $TH_{RR}$.

If it is decided in Step S120 that the vehicle is running on a rough road, the processor 11 resets the flag $F_{RR}$ to the value "0" representing that the rough road running judgment is not being performed (Step S121), and restarts the fourth timer for counting the elapsed time TIM4 from the time of rough road running decision (Step S122). Then, the processor 11, judging that the temporary misfire detection in Step S116 in the previous detection cycle is affected by rough road running, cancels the temporary storage of misfire detection cylinder (Step S123). Thus, the detecting operation in the present cycle is terminated.

During the rough road running judgment, if the angular acceleration $D\omega_n$ is equal to or less than the rough road decision level $TH_{RR}$ and it is not decided that the vehicle is running on a rough road, the misfire detecting operation in the present cycle is immediately terminated. According to such a deciding method, the misfiring condition occurring during the rough road running judgment is ignored. Therefore, when it is not decided in Step S120 that the vehicle is running on a rough road, the occurrence/absence of a misfire condition may be decided separately.

If it is decided in Step S119 that the elapsed time TIM6 from the start of rough road running judgment is equal to or more than the seventh set value and the rough road running judgment time has already elapsed, while the above-described rough road running judgment is repeated, the processor 11 resets the flag $F_{RR}$ to the value "0" representing that the rough road running judgment is not being performed (Step S124), and then turns on the alarm lamp 60 in Steps 125 and S126 corresponding to Steps S26 and S27 in FIG. 6. The processor 11, Judging that the misfire detection stored temporarily in Step S116 in the previous detection cycle is not affected by rough road running, definitely stores the misfire detection cylinder. Then, the processor 11 restarts the fifth timer for counting the elapsed time from the time of misfire detection (Step S127), and terminates the detecting operation in the present cycle.

Figure 11:
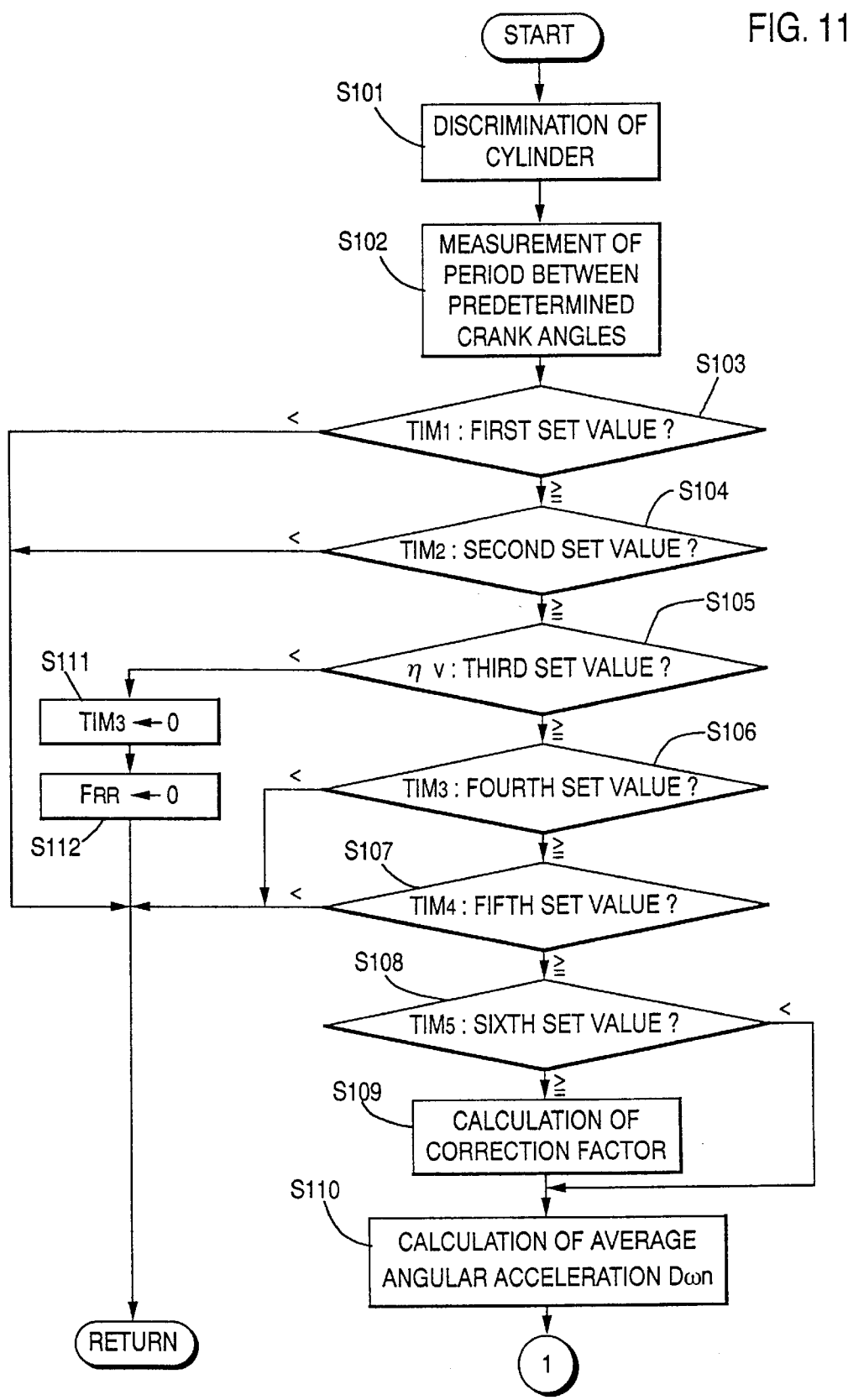
FIG. 11 is a flowchart showing part of misfire detecting operation in the method for detecting misfire in accordance with a third embodiment of the present invention.
Figure 12:
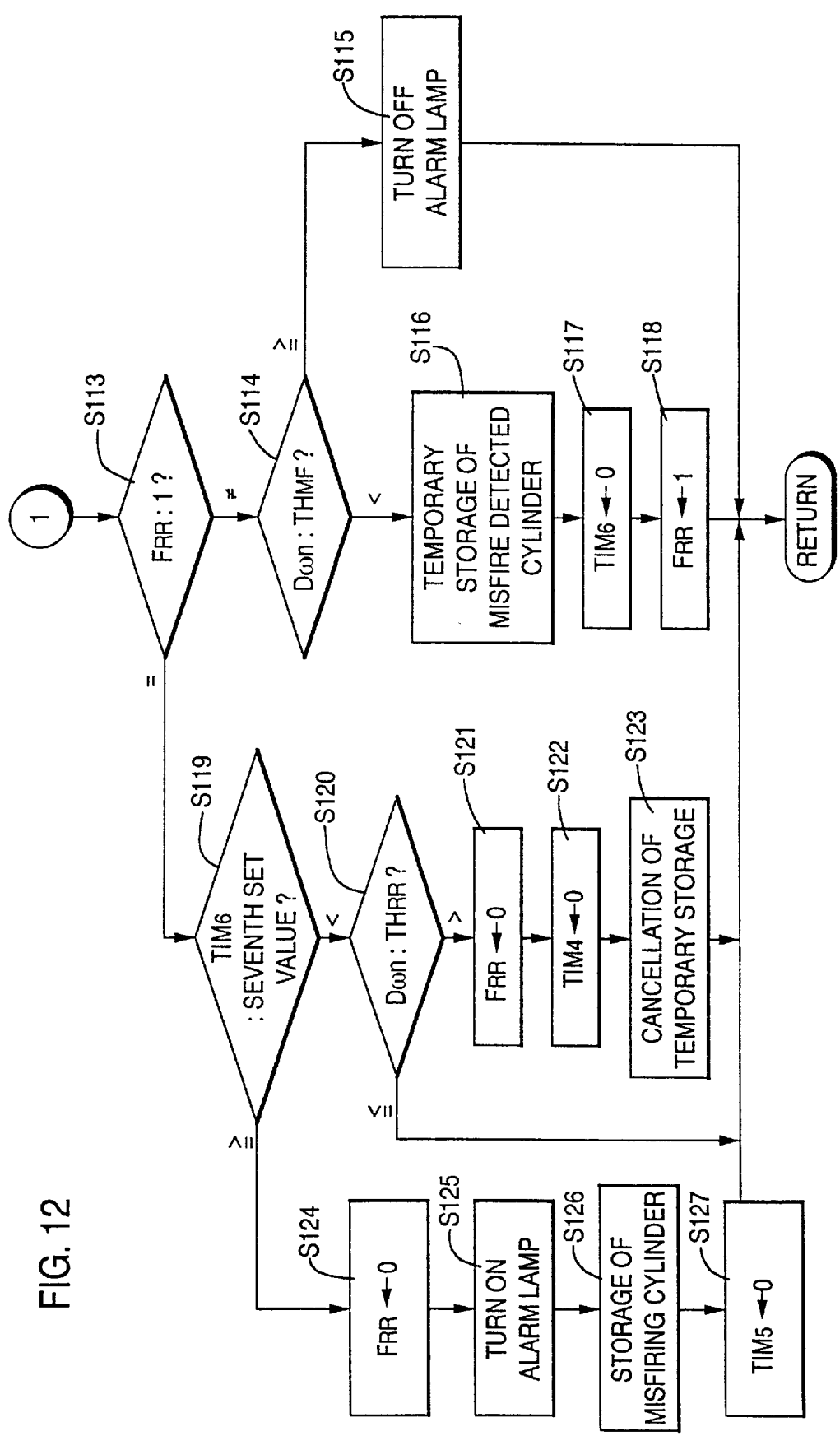
FIG. 12 is a flowchart showing the remainder of misfire detecting operation which is partly shown in FIG. 11.

According to the procedure shown in FIGS. 11 and 12, the decelerating operating condition, the gear shift, the rough road running and the like can be conveniently decided without special hardware.

A method for detecting misfire in accordance with a fourth embodiment of the present invention will be described below with reference to FIGS. 13 through 15.

Figure 1:
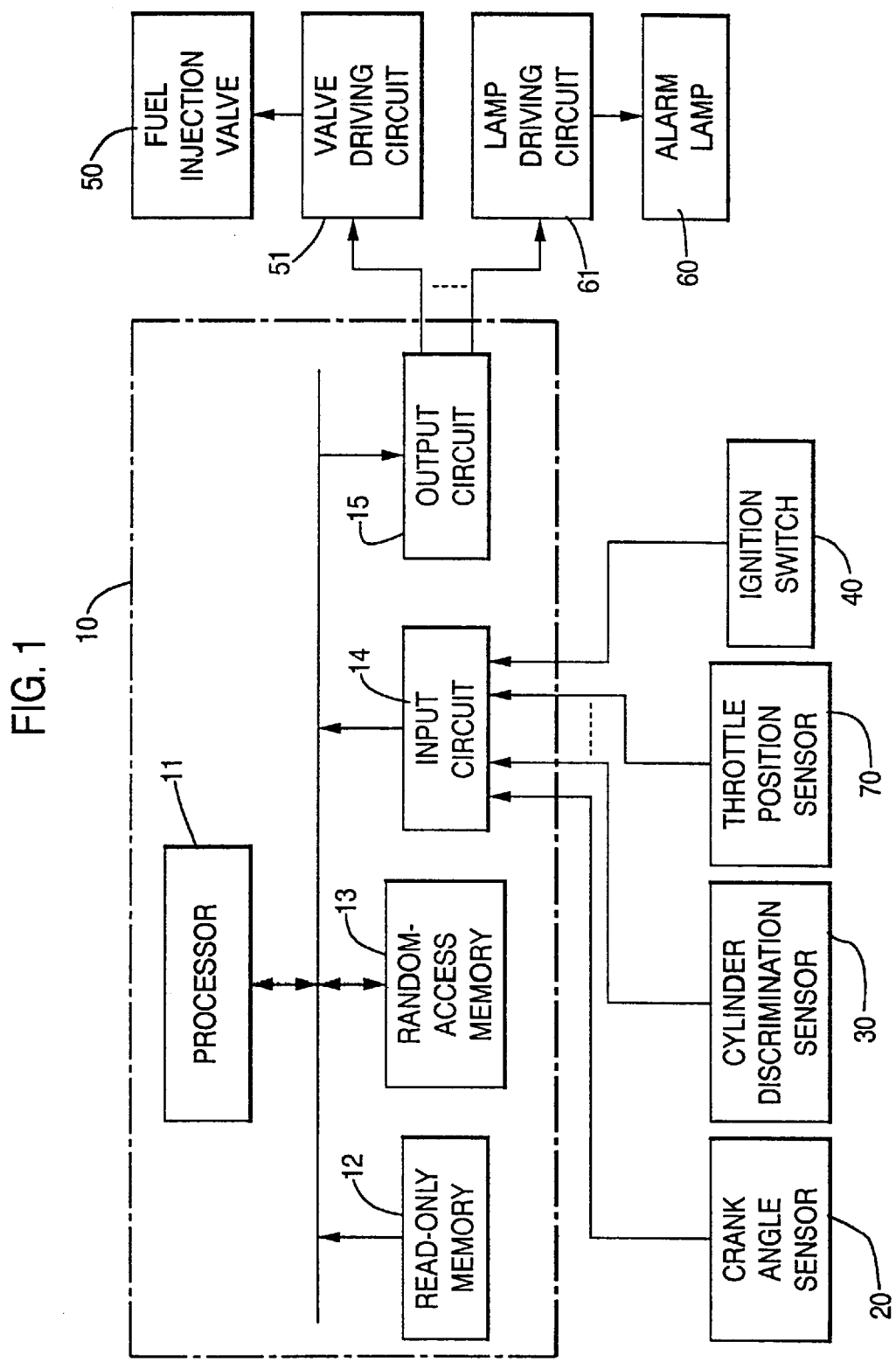
FIG. 1 is a schematic block diagram showing a detecting device for carrying out the method for detecting misfire in accordance with the present invention.

The method for detecting a misfire in accordance with this embodiment is characterized mainly in that the rough road running Judgment is performed by a procedure different from that shown in FIGS. 11 and 12 and on the basis of the output from the throttle position sensor (denoted by reference numeral 70 in FIG. 1). The method of this embodiment can be carried out by using the detecting device shown in FIGS. 1 and 2; therefore, the explanation of the device is omitted.

Figure 13:
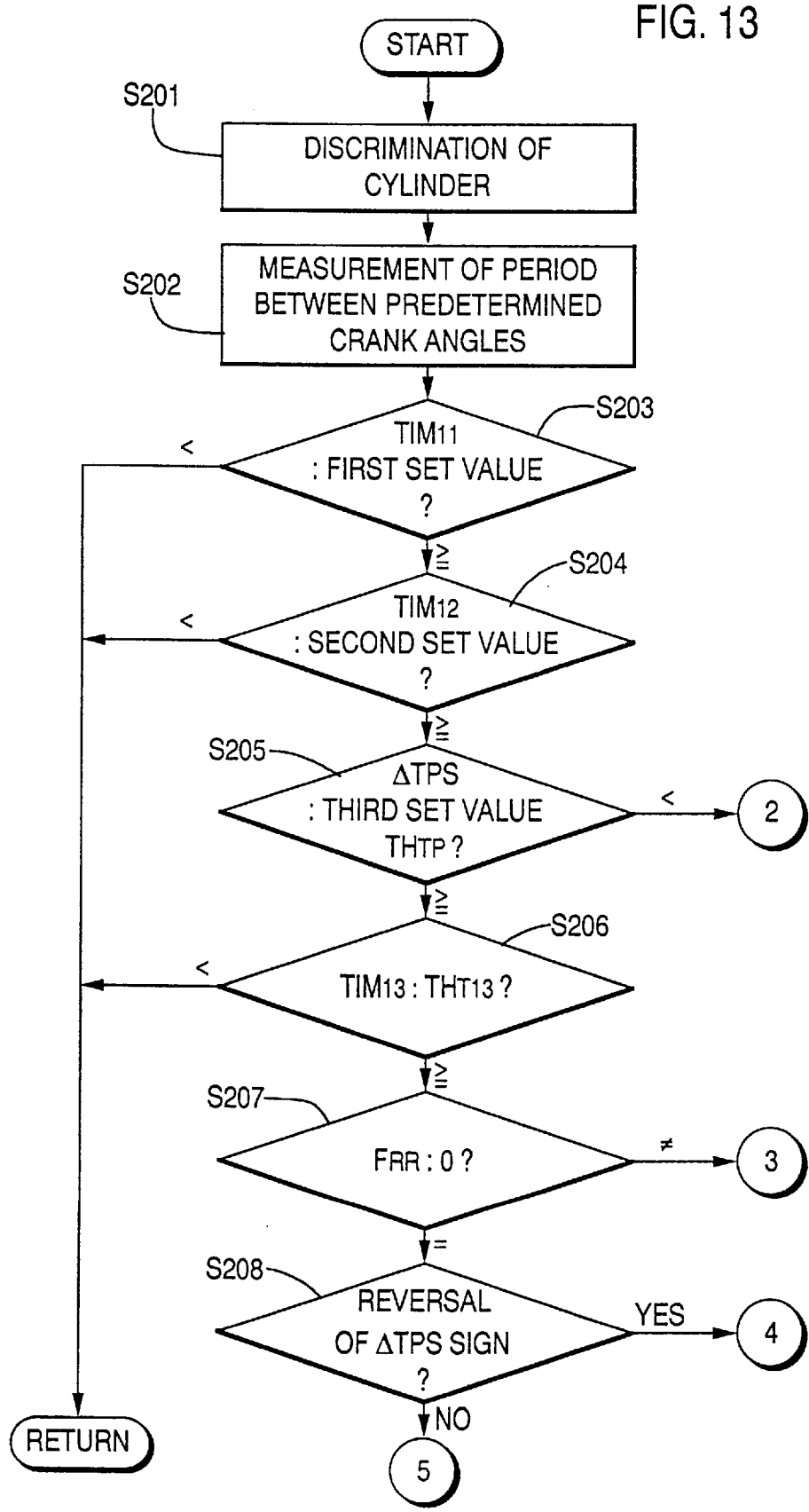
FIG. 13 is a flowchart showing part of misfire detecting operation in the method for detecting misfire in accordance with a fourth embodiment of the present invention.
Figure 14:
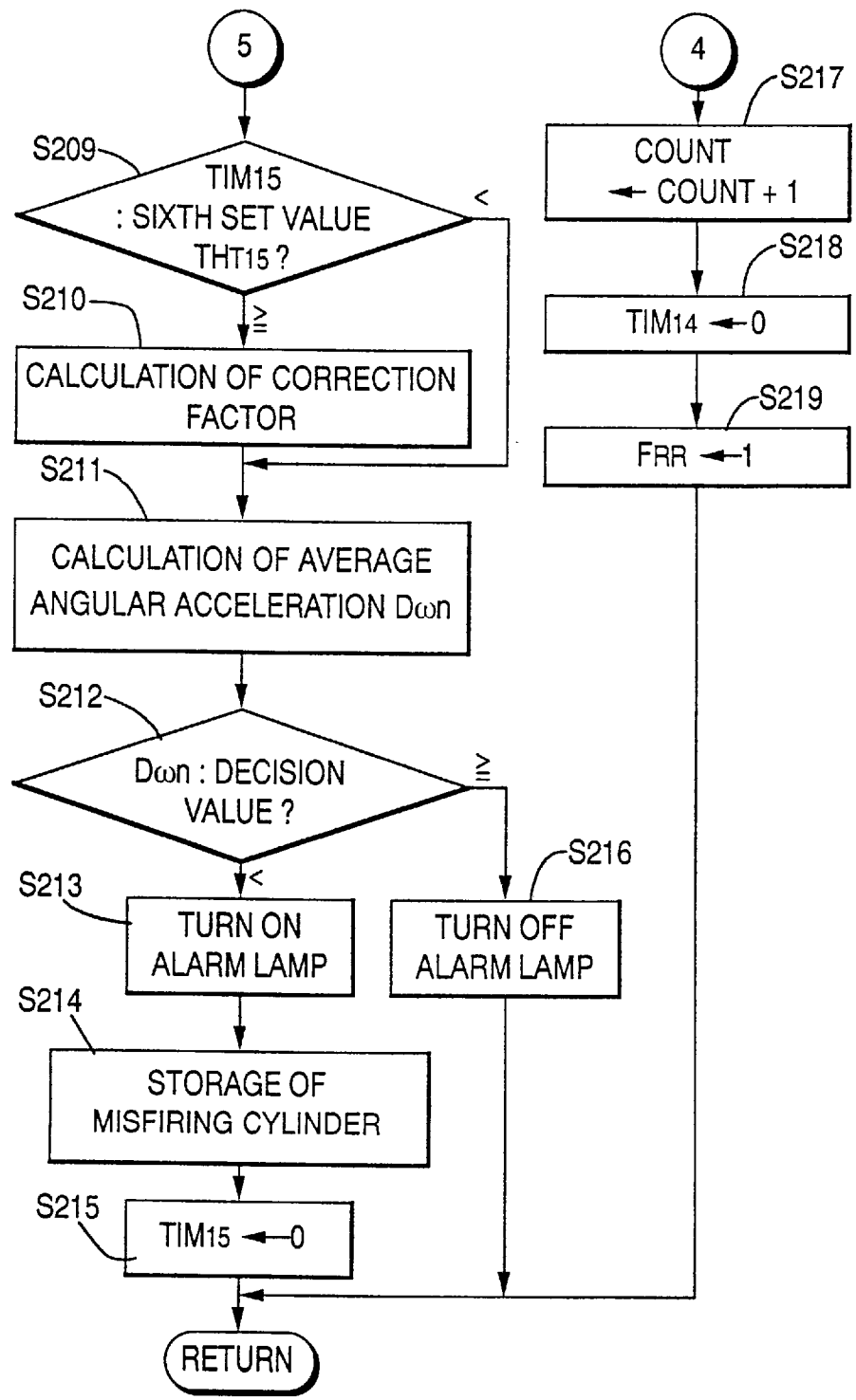
FIG. 14 is a flowchart showing another part of misfire detecting operation which is partly shown in FIG. 13.
Figure 15:
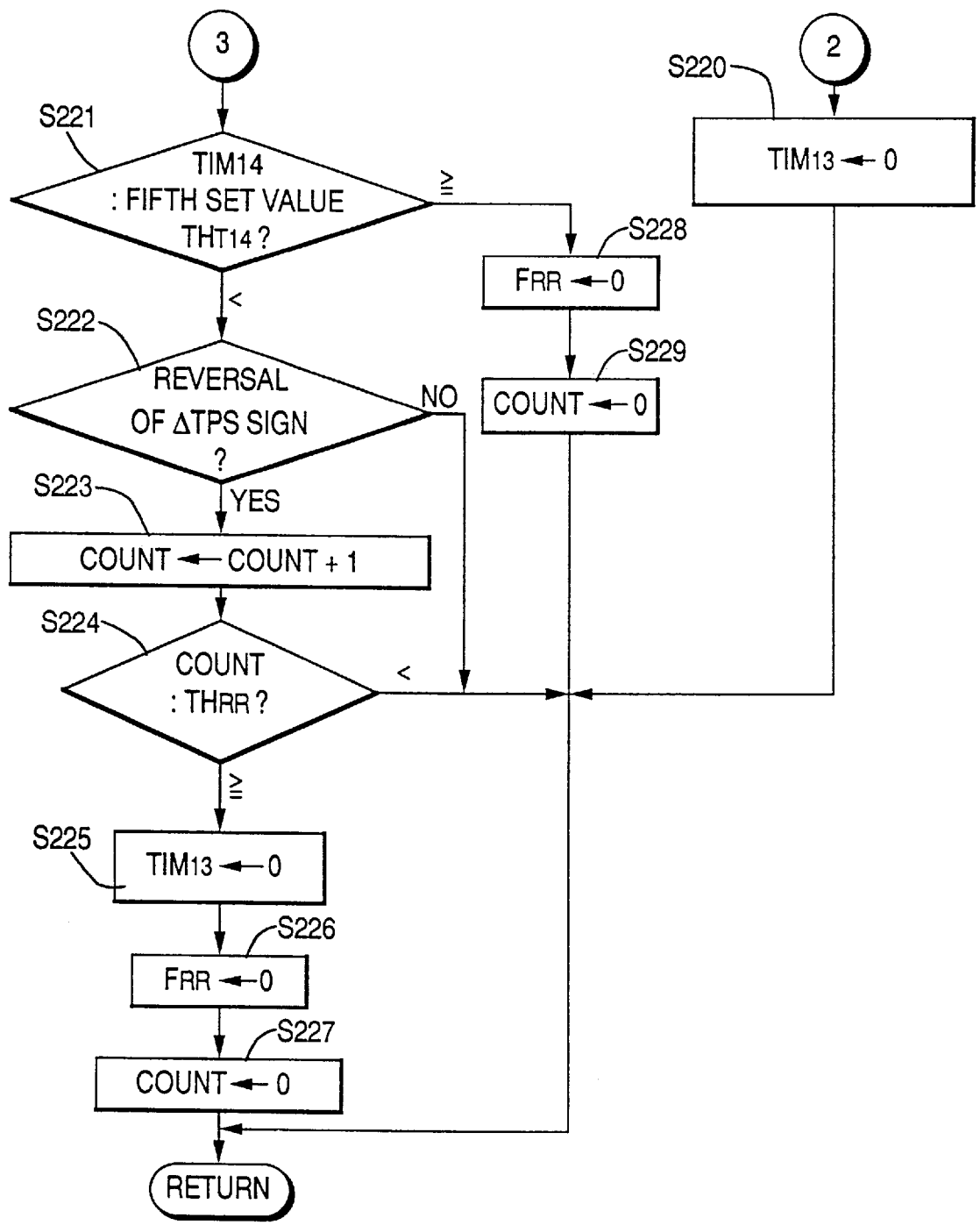
FIG. 15 is a flowchart showing the remainder of misfire detecting operation which is partly shown in FIGS. 13 and 14.

As shown in FIGS. 13 through 15, in each cycle of misfire detecting operation performed by the method of this embodiment, the processor 11 sequentially executes Steps S201 through S204 corresponding to Steps S101 through S104 in FIG. 11, respectively. If it is decided in Step S203 that the elapsed time TIM11 determined by referring to a first timer for counting the elapsed time TIM11 from the engine start is less than a first set value, or if it is decided in Step S204 that the elapsed time TIM12 determined by referring to a second timer for counting the elapsed time TIM12 from the ignition key turning off time is less than a second set value, the processor 11 immediately terminates the detecting operation in the present cycle, by which errors in calculating the correction factor and in detecting misfire are prevented when the engine is started or when the ignition key is turned off.

If it is decided in Steps S203 and S204 that the elapsed times TIM11 and TIM12 are equal to or more than the set value and the engine is not being started and the ignition key is not being turning off, the processor 11 reads the output TPS of the throttle position sensor 70, and reads, from the memory, the throttle position sensor output TPS which has been read in the previous cycle and stored in the memory 13. Further, the processor 11 calculates the change in throttle position from the throttle position in the previous cycle to the throttle position in the present cycle, that is, the sensor output change rate ΔTPS representing the change rate in throttle position. Then the processor 11 compares the sensor output change rate ΔTPS with a third set value $TH_{TP}$ ($TH_{TP}<0$) to decide whether the engine is being operated in the decelerating condition or not (Step S205). To decide the start of decelerating operation, the change rate of actual load level detected by another engine load condition detecting sensor such as an air flow sensor or a suction air negative pressure sensor may be used in place of the throttle sensor output (change rate ΔTPS).

If it is decided in Step S205 that the throttle position sensor output change rate ΔTPS is less than the set value $TH_{TP}$ and the engine is operated in the decelerating condition, the processor 11 restarts the third timer which counts the elapsed time TIM13 from the time when the engine starts decelerating operation or from the time when the rough road running is decided (Step S220 in FIG. 15), and terminates the detecting operation in the present cycle.

If it is decided in Step S205 that the sensor output change rate ΔTPS is equal to or more than the set value $TH_{TP}$ and the engine is not in the decelerating operating condition, the processor 11 compares the elapsed time TIM13 from the time when the engine starts decelerating operation or from the time when the rough road running is decided, which is determined by referring to the third timer, with a fourth set value $TH_{T13}$ representing the prohibition time of the calculation and renewal of correction factor and the detection of a misfire (Step S206). The processor 11 immediately terminates the detecting operation in the present cycle if the elapsed time TIM13 is less than the value $TH_{T13}$ and the prohibition time has not yet elapsed, whereas the processor 11 compares the value of rough road judgment flag $F_{RR}$ with the value "0" if the prohibition time has already elapsed (Step S207).

If the value of flag $F_{RR}$ is "0" representing that the rough road running judgment is not being performed, the processor 11 reads from the memory the throttle position sensor outputs TPS which have been read in the previous and present cycles and stored in the memory 13, and calculates the sensor output change rate ΔTPS from the previous cycle to the present cycle. Next, to decide whether the rough road judgment is to be started or not, the processor 11 decides whether the sign of sensor output change rate ΔTPS has been reversed or not, that is, whether the value ΔTPS has changed from positive to negative or from negative to positive (Step S208). Preferably, to provide this decision with a hysteresis characteristic, the processor 11 decides that the sign of the sensor output change rate ΔTPS has been reversed when the sign has changed from positive to negative or from negative to positive while the value ΔTPS changes over a range beyond the predetermined threshold.

If it is decided in Step S208 that the sign of the sensor output change rate ΔTPS is not reversed, the processor 11 compares the elapsed time TIM15 from the misfire detection time, which is counted by a fifth timer restarted in the manner as described later when the occurrence of misfire is detected, with a sixth set time $TH_{T15}$ representing the prohibition time of the calculation and renewal of correction factor from the time of misfire detection, to decide whether the calculation of correction factor is required or not (Step S209 (corresponding to Step S108 in FIG. 11)). If it is decided in Step S209 that the elapsed time TIM15 is equal to or more than the set value $TH_{T15}$ and the prohibition time of the calculation and renewal of correction factor has already elapsed, the processor 11 sequentially executes the correction factor calculation step S210, the average angular acceleration calculation step S211, and the misfire detection step S212, which correspond to Steps S20 and S24 in FIG. 5 and Step S25 in FIG. 6, respectively. If it is decided in Step S209 that the elapsed time TIM15 is less than the set value $TH_{T15}$ and the prohibition time of the calculation and renewal of correction factor has not yet elapsed, the processor 11 immediately goes to the angular acceleration calculation step S211 without executing the calculation and renewal of correction factor in Step S210.

If it is decided in Step S212 that the calculated angular acceleration $D\omega_n$ in the present cycle is less than the decision value and a misfire occurs in the cylinder determined in Step S201 in the present cycle, the processor 11 turns on the alarm lamp 60 (Step S213), stores the misfiring cylinder (Step S214), and restarts the fifth timer for counting the elapsed time TIM15 from the time when misfire is detected (Step S215). Then, the processor 11 terminates the detecting operation in the present cycle. If it is decided in Step S212 that misfire does not occur in the determined cylinder, the processor 11 turns off the alarm lamp 60 (Step S216), and terminates the detecting operation in the present cycle.

If it is decided in Step S208 that the sign of the throttle position sensor output change rate ΔTPS has been reversed, the processor 11 adds the value "1" to the count value COUNT of a rough road deciding counter (not shown) to start the rough road decision (Step S217), and restarts a fourth timer (not shown) for counting the elapsed time TIM14 from the moment when the rough road Judgment is started (Step S218). Then, the processor 11 sets the flag $F_{RR}$ to "1" representing that rough road judgment is being performed (Step S219), and terminates the detecting operation in the present cycle.

In the detection cycle which is started immediately after the value of flag $F_{RR}$ is set to "1", if it is decided in Step S207 that the value of flag $F_{RR}$ is not "0", the processor 11 compares the elapsed time TIM14 from the time when the rough road judgment is started with a fifth set value $TH_{T14}$ representing the rough road judgment time (Step S221). If it is decided in Step S221 that the elapsed time TIM14 is less than the set value $TH_{T14}$ and the rough road judgment time has not yet elapsed, the processor 11 decides whether the sign of the throttle position sensor output change rate ΔTPS has been reversed or not (Step S222). If the sign of the value ΔTPS has not been reversed, the processor 11 terminates the detecting operation in the present cycle. If the sign of the value ΔTPS has been reversed, the processor 11 adds the value "1" to the count value COUNT of the rough road deciding counter (Step S223), and then compares the renewed count value COUNT with a seventh set value $TH_{RR}$ corresponding to the number of sign reversals of the sensor output change rate ΔTPS, which represents that the vehicle is running on a rough road (Step S224).

If it is decided in Step S224 that the count value COUNT is less than the set value $TH_{RR}$ and it can not ascertained that the vehicle is running on a rough road, the processor 11 terminates the detecting operation in the present cycle. If it is decided in Step S224 that the count value COUNT is equal to or more than the set value $TH_{RR}$, the processor 11 decides that alternate operations of depressing and releasing of accelerator pedal have already been performed predetermined times; therefore, the vehicle is running on a rough road. When the rough road running is decided in such a manner, the processor 11 restarts the third timer for counting the elapsed time TIM13 from the moment when the rough road running is decided (Step S225), resets the flag $F_{RR}$ to "0" representing that rough road judgment is not being performed (Step S226), and further resets the count value COUNT of the rough road deciding counter to "0" (Step S227).

If it is decided in Step S221 that the elapsed time TIM14 from the moment when the rough road running judgment is started is equal to or more than the set value $TH_{T14}$, the processor 11 decides that it is not necessary to continue judging whether the vehicle is running on a rough road or not. In this case, the processor 11 resets the value of flag $F_{RR}$ to "0" representing that rough road running judgment is not being performed (Step S228), resets the count value COUNT of the rough road deciding counter to "0" (Step S229), and terminates the detecting operation in the present cycle.

The present invention is not limited to the above first to fourth embodiments, and various modifications can be made.

For example, although the case where the present invention is applied to a 6-cylinder engine was explained in the above embodiments, the present invention can be applied to various types of engines including a 4-cylinder engine.

In the second through fourth embodiments described above, the calculation and renewal of correction factor were prohibited in the condition where the engine was in decelerating operation or in other conditions. However, this prohibition is not essential in carrying out the method of the present invention. Even in the condition where the engine is in decelerating operation or in other conditions, both of the calculation and renewal of correction factor may be allowed as with the first embodiment, or only the calculation of correction factor may be allowed.

In the second embodiment described above, a separate and independent correction factor was used for each of a plurality of engine operating regions which were classified in advance, the magnitude of correction factor was regulated, and the calculated correction factor was stored in memory to reuse it at engine start. However, none of them is indispensable in carrying out the present invention. On the other hand, the first, the third and/or the fourth embodiment can be modified such that the correction factor for each engine operating region is used, the correction factor is regulated, and/or the calculated correction factor is stored in memory. Further, in the second embodiment, when the calculated correction factor exceeded the maximum value of correction factor, the maximum value was used in place of the calculated correction factor. However, when the calculated correction factor is less than the minimum value of correction factor, the minimum value may be used in place of the calculated value, or when the calculated value deviates from the allowable range of correction factor, a suitable value, for example, corresponding to one of the maximum and minimum values of correction factor may be used in place of the calculated value.

In the third and fourth embodiments described above, the continuation or start of decelerating operating condition was detected on the basis of the volumetric efficiency ηv or the throttle position sensor output change rate ΔTPS, and it was decided that gear shift was being performed until a predetermined time elapsed after the engine left the decelerating operating condition. Further, it was decided that the vehicle was running on a rough road when the angular acceleration exceeded the rough road decision level after the misfire condition was once detected, or when the sign of the sensor output change rate ΔTPS was reversed (the accelerator pedal was depressed or released) predetermined times. However, the decelerating operation, gear shift, and rough road running can be detected by various methods. For example, the decelerating operating condition can be detected on the basis of the degree of opening of throttle valve, the amount of suction air, etc. Also, the rough road running can be detected on the basis of the front and rear wheel speeds, the vehicle body acceleration, etc. Particularly in the fourth embodiment described above, the start of decelerating operation was determined on the basis of the throttle position sensor output change rate ΔTPS, and after this determination, the detection of misfire and the calculation and renewal of correction factor were prohibited by Judging that there was a high possibility of continuation of decelerating operation (or there was a high possibility of mistaken detection of a misfire on the basis of decelerating operation, or the effect due to gear shift remains) during the set time (that is, until the elapsed time TIM13 counted by the third timer exceeded the set value). However, in determining the start of decelerating operation, it may be detected that the change rate Δηv of the volumetric efficiency ηv determined from the air flow sensor output or the like is less than the set value in place of or in addition to the determination of throttle position sensor output change rate ΔTPS. Or, it may be detected that the suction air pressure $P_B$ determined from the boost sensor output or the like is less than the set value.

We claim:

1. A misfire detection method in which an occurrence of a misfire in an internal combustion engine is detected based on a change in crankshaft rotation, comprising the steps of:

detecting a time interval from one time point, detected by a crank angle sensor, of entering into a crankshaft rotation angle region corresponding to a particular stroke phase of each cylinder of an internal combustion engine to another time point, detected by the crank angle sensor, of leaving from the angle region, with a timer which counts said timer interval at a predetermined fixed rate independently of the rotational speed of the internal combustion engine;

calculating and updating a correction factor each time said time interval is detected while said internal combustion engine is continuously being propelled by combustion of fuel therein, for compensating an error in construction of the crank angle sensor, said correction factor being calculated based on a latest detected time interval, a timer period for a crankshaft to complete at least a single rotation, and a predetermined weighing factor;

correcting rotation information of the internal combustion engine based on the detected time interval by using said correction factor; and detecting the occurrence of misfire based on said corrected rotation information of the internal combustion engine.

2. The misfire detection method according to claim 1, wherein, said rotation information of the internal combustion engine is an average angular acceleration of the crankshaft.

3. The misfire detection method according to claim 2, wherein, said correction factor is repeatedly calculated based on the time interval detected sequentially during operation of the internal combustion engine to renew said correction factor, and an average angular velocity of the crankshaft is sequentially determined based on the time interval, and said average angular acceleration is sequentially calculated based on the time interval, said average angular velocity, and said correction factor.

4. The misfire detection method according to claim 1, wherein, said correction factor is repeatedly calculated based on the time interval sequentially detected during operation of the internal combustion engine to renew said correction factor, whereas the renewal of said correction factor is prohibited during operation of the internal combustion engine when the internal combustion engine is operated in a particular condition where a rapid fluctuation of an output torque large enough to erroneously detect a misfire is presumed.

5. The misfire detection method according to claim 4, wherein, at least one of conditions where the internal combustion engine is decelerated, where gear shift is performed by a transmission connected to the internal combustion engine, and where a vehicle on which the internal combustion engine is mounted is running on a rough road, is judged to be said particular operating condition.

6. The misfire detection method according to claim 1, wherein, said correction factor is repeatedly calculated based on the time interval combustion engine to renew said correction factor, whereas the renewal of the correction factor is prohibited when a predetermined time does not elapse from a time point when the internal combustion engine is started.

7. The misfire detection method according to claim 1, wherein, a separate and independent correction factor is calculated for each of a plurality of operating regions classified by a predetermined operation parameter of the internal combustion engine, and the correction factor for a present operating region is renewed each time the present operating region is determined, whereas the renewal of the correction factor for an operating region other than said present operating region is prohibited.

8. The misfire detection method according to claim 7, wherein, said predetermined operation parameter is a rotation speed of the internal combustion engine.

9. The misfire detection method according to claim 7, wherein, said predetermined operation parameter is a volumetric efficiency of the internal combustion engine.

10. The misfire detection method according to claim 7, wherein, said operating regions are classified by a rotation speed and a volumetric efficiency of the internal combustion engine which are said predetermined operation parameters.

11. The misfire detection method according to claim 1, wherein, said correction factor is repeatedly calculated based on the time interval sequentially detected during operation of the internal combustion engine to renew said correction factor, whereas a maximum or minimum value corresponding to a predetermined allowable range is used as said correction factor in place of said calculated correction factor when said calculated correction factor deviates from said allowable range.

12. The misfire detection method according to claim 11, wherein, upper and lower limit values of said allowable range correspond to a maximum allowable error in the construction of the crank angle sensor.

13. The misfire detection method according to claim 1, wherein, said calculated correction factor is stored in a nonvolatile memory, and said correction factor read from said nonvolatile memory is used as an initial value of said correction factor when the internal combustion engine is started.

14. The misfire detection method according to claim 1, further including the steps of:

using the crank angle sensor comprising a rotating body which rotates together with the crankshaft, a plurality of discriminating means which are installed at intervals in a circumferential direction on said rotating body to discriminate between the entering time point and the leaving time point, and a detecting portion which is disposed on a fixed member of the internal combustion engine and which is operable to generate a detection signal each time each of said discriminating means approaches said detecting portion, said discriminating means including first and second discriminating means for each cylinder;

detecting the time interval by counting a interval between a first detection signal generated by the approach of the first discriminating means to said detecting portion and a second detection signal generated by the approach of the second discriminating means to said detecting portion; and determining said correction factor based on the time interval and a rotation period of the crankshaft including at least one of time points of occurrences of said first and second detection signals used for the detection of the time interval.

15. The misfire detection method according to claim 14, wherein, said method is applied to a multi-cylinder internal combustion engine in which a plurality of cylinders are subjected to explosion strokes sequentially at equal intervals during the rotation of the crankshaft, and uses the crank angle sensor which is designed so that the second discriminating means for each cylinder functions as said first discriminating means for the next cylinder which is succeedingly subjected to explosion stroke.

16. A method for detecting misfire by fluctuation in crankshaft rotation according to claim 14, wherein, a momentary correction factor information determined sequentially based on the detected time interval and the rotation period of the crankshaft during operation of the internal combustion engine is smoothed, and the rotation information of the internal combustion engine is corrected by using the smoothed value.

17. The misfire detection method according to claim 14, wherein, said correction factor is repeatedly calculated based on the time interval detected sequentially during operation of the internal combustion engine to renew said correction factor, and a latest correction factor KLm(n) is calculated by using equations $$KLm(n) = a \cdot KLm(n-1) + (1-a) \cdot KLm$$

and $$KLm = \{A \cdot Tm(n)\}/T(n)$$

where Tm(n) is said latest detected time interval, A is an installed number of the discriminating means installed on said rotating body, T(n) is a latest rotation period of the crankshaft, KLm(n−1) is a previously calculated correction factor, and a ($0 \leq a \leq 1$) is the weighing factor.

* * * * *